United States Patent
Osada et al.

(10) Patent No.: US 10,822,277 B2
(45) Date of Patent: Nov. 3, 2020

(54) OXIDATION-INDUCED SELF-HEALING CERAMIC COMPOSITION CONTAINING HEALING ACTIVATOR, METHOD FOR PRODUCING SAME, USE OF SAME, AND METHOD FOR ENHANCING FUNCTIONALITY OF OXIDATION-INDUCED SELF-HEALING CERAMIC COMPOSITIONS

(71) Applicant: National Institute for Materials Science, Ibaraki (JP)

(72) Inventors: Toshio Osada, Tsukuba (JP); Kiichi Kamoda, Tsukuba (JP); Toru Hara, Tsukuba (JP); Masanori Mitome, Tsukuba (JP); Taichi Abe, Tsukuba (JP); Takahito Ohmura, Tsukuba (JP); Wataru Nakao, Yokohama (JP)

(73) Assignee: National Institute for Materials Science, Ibaraki (JP)

( * ) Notice: Subject to any disclaimer, the term of this patent is extended or adjusted under 35 U.S.C. 154(b) by 0 days.

(21) Appl. No.: 15/736,456

(22) PCT Filed: Jun. 13, 2016

(86) PCT No.: PCT/JP2016/067513
§ 371 (c)(1),
(2) Date: Dec. 14, 2017

(87) PCT Pub. No.: WO2016/204113
PCT Pub. Date: Dec. 22, 2016

(65) Prior Publication Data
US 2018/0170811 A1    Jun. 21, 2018

(30) Foreign Application Priority Data

Jun. 17, 2015 (JP) .................... 2015-122293

(51) Int. Cl.
C04B 35/117 (2006.01)
C04B 35/78 (2006.01)
(Continued)

(52) U.S. Cl.
CPC ............ *C04B 35/185* (2013.01); *C04B 35/10* (2013.01); *C04B 35/117* (2013.01);
(Continued)

(58) Field of Classification Search
CPC ...... C04B 35/10; C04B 35/111; C04B 35/117
See application file for complete search history.

(56) References Cited

U.S. PATENT DOCUMENTS 3,580,708 A * 5/1971 Ogawa et al. ........ C04B 35/111
51/307
4,547,470 A * 10/1985 Tanase .................. C04B 35/597
264/122

(Continued)

FOREIGN PATENT DOCUMENTS

CN         1569733 A  *  1/2005
CN       101265079 A  *  9/2008

(Continued)

OTHER PUBLICATIONS

Machine translation of CN 1569733, Jan. 26, 2005.*
(Continued)

*Primary Examiner* — Karl E Group
(74) *Attorney, Agent, or Firm* — Morgan, Lewis & Bockius LLP

(57) ABSTRACT

The present invention relates to an oxidation-induced highly-functional self-healing ceramic composition, a method for producing the ceramic composition, a use of the ceramic composition and a method for achieving the enhancement of the functionality of the ceramic composition, by focusing on a repairing stage and a remodeling state (Continued)

in a self-healing process and by carrying out elemental and structural designing of an oxidation-induced self-healing ceramic composition for the purpose of speeding up these stages.

13 Claims, 9 Drawing Sheets

(51) Int. Cl.
*C04B 35/185* (2006.01)
*C04B 35/10* (2006.01)
*C04B 35/63* (2006.01)
*C04B 35/645* (2006.01)
*F01D 5/28* (2006.01)
*F01D 9/04* (2006.01)
*F01D 25/00* (2006.01)
*C04B 35/577* (2006.01)

(52) U.S. Cl.
CPC ........ *C04B 35/6303* (2013.01); *C04B 35/645* (2013.01); *F01D 5/284* (2013.01); *F01D 9/041* (2013.01); *F01D 25/005* (2013.01); *C04B 2235/3206* (2013.01); *C04B 2235/3217* (2013.01); *C04B 2235/3224* (2013.01); *C04B 2235/3225* (2013.01); *C04B 2235/3227* (2013.01); *C04B 2235/3229* (2013.01); *C04B 2235/3262* (2013.01); *C04B 2235/3463* (2013.01); *C04B 2235/3826* (2013.01); *C04B 2235/3891* (2013.01); *C04B 2235/5436* (2013.01); *C04B 2235/5445* (2013.01); *C04B 2235/80* (2013.01); *C04B 2235/85* (2013.01); *F05D 2220/32* (2013.01)

(56) References Cited

U.S. PATENT DOCUMENTS

| | | | | | |
|---|---|---|---|---|---|
| 4,796,127 | A | * | 1/1989 | Wada | G11B 5/10 360/235.3 |
| 4,797,238 | A | * | 1/1989 | Rhodes | C04B 35/115 264/1.21 |
| 4,852,999 | A | * | 8/1989 | Mehrotra | B24D 3/06 51/309 |
| 4,925,458 | A | * | 5/1990 | Mehrotra | B24D 3/06 51/293 |
| 4,960,735 | A | * | 10/1990 | Mehrotra | B23B 27/148 501/89 |
| 5,106,788 | A | * | 4/1992 | Suzuki | C04B 35/111 501/87 |
| 5,275,981 | A | * | 1/1994 | Nishiyama | B23B 27/148 428/698 |
| 5,352,533 | A | * | 10/1994 | Dreyer | C04B 35/111 428/472 |
| 5,360,772 | A | * | 11/1994 | Hayashi | C04B 35/111 501/127 |
| 5,500,394 | A | * | 3/1996 | Kondakov | C04B 35/565 252/516 |
| 5,505,751 | A | * | 4/1996 | Mehrotra | B24D 3/06 407/119 |
| 5,538,926 | A | * | 7/1996 | Tsuchida | C04B 35/117 501/127 |
| 5,688,729 | A | * | 11/1997 | Andersson | C04B 35/119 264/125 |
| 5,965,266 | A | * | 10/1999 | Goujard | C04B 35/806 427/228 |
| 9,550,699 | B2 | * | 1/2017 | Moteki | C04B 35/5626 |
| 2001/0008865 | A1 | * | 7/2001 | Nakayasu | C04B 35/565 501/88 |
| 2003/0121475 | A1 | | 7/2003 | Chu et al. | |

FOREIGN PATENT DOCUMENTS

| | | | |
|---|---|---|---|
| CN | 101407411 A | | 4/2009 |
| CN | 104446395 A | * | 3/2015 |
| EP | 0 659 708 A1 | | 6/1995 |
| JP | 58172262 A | * | 10/1983 |
| JP | 59102863 A | * | 6/1984 |
| JP | 59102864 A | * | 6/1984 |
| JP | 59102865 A | * | 6/1984 |
| JP | 60210571 | * | 10/1985 |
| JP | 60210571 A | * | 10/1985 |
| JP | 03153568 A | * | 7/1991 |
| JP | 05002730 A | * | 1/1993 |
| JP | 05319910 A | * | 12/1993 |
| JP | H07-138067 A | | 5/1995 |
| JP | H11-147769 A | | 6/1999 |
| JP | H11-147774 A | | 6/1999 |
| JP | 2012-148963 A | | 8/2012 |
| RU | 2498957 C1 | * | 11/2013 |

OTHER PUBLICATIONS

Machine translation of CN 101407411, Apr. 15, 2009.*
Farle et al., "A conceptual study into the potential of Mn+1AXn-phase ceramics for self-healing of crack damage", Journal of the European Ceramic Society, 2014 (in press).
Yoshioka et al., "Methodology for evaluating self-healing agent of structural ceramics", J. Intelligent Mater. Struct. pp. 1045389X14544137, 2014.
International Search Report issued in corresponding International Patent Application No. PCT/JP2016/067513, dated Jul. 19, 2016.
Lee et. al., "Crack-healing behaviour of mullite/SiC/Y2O3 composites and its application to the structural integrity of machined components", Journal of the European Ceramic Society, vol. 25, No. 15, Oct. 1, 2005, pp. 3495-3502, XP027618331.
Kim et al., "Bending strength and crack-healing behavior of Al2O3/SiC composites ceramics", Materials Science and Engineering A, vol., 483-484, Jun. 15, 2008, pp. 672-675, XP022619330.
Yoshioka et al., "Self-healing behavior of self-healing mullite", The Proceedings of Mechanical Engineering Congress, vol. 2012, No. 0, Jan. 1, 2012, pp. J044074-1, XP55514015.
Thomson Scientific, XP002785625, Database WPI (2009).
Extended European Search Report issued in corresponding European Patent Application No. 16811587.1, dated Oct. 24, 2018.
Jeong et. al., "Microstructure and properties of alumina-silicon carbide nanocomposites fabricated by pressureless sintering and post hot-isostatic pressing", Trans. Nonferrous Met. Soc. China 21(2011) s1-s6.
European Examination Report issued in corresponding European Patent Application No. 16811587.1, dated Jul. 4, 2019.

* cited by examiner

FIG.4

| Temperature in Furnace | Composition | | |
|---|---|---|---|
| | $Al_2O_3$/ 30 vol.% SiC | $Al_2O_3$/ 30 vol.% SiC/ 0.2 vol.% MgO | $Al_2O_3$/ 30 vol.% SiC/ 0.2 vol.% MnO |
| $T \approx 800$ °C | | | Local Bubble Formation |
| $T \approx 1000$ °C | | | Bubble Formation at Entire Surface / 10 min-later |
| $T \approx 1250$ °C | | Local Bubble Formation | |
| $T \approx 1350$ °C | | Bubble Formation at Entire Surface | |

OXIDATION-INDUCED SELF-HEALING CERAMIC COMPOSITION CONTAINING HEALING ACTIVATOR, METHOD FOR PRODUCING SAME, USE OF SAME, AND METHOD FOR ENHANCING FUNCTIONALITY OF OXIDATION-INDUCED SELF-HEALING CERAMIC COMPOSITIONS

TECHNICAL FIELD

The present invention relates to an oxidation-induced, high-functional, self-healing ceramic composition and specifically relates to an oxidation-induced self-healing ceramic composition comprising a healing activator, a method for producing the same, a use of the same, and a method for enhancing the functionality of an oxidation-induced self-healing ceramic composition. Particularly, the present invention relates to a ceramic composition capable of being used as a high-temperature structural member including turbine blades and vanes for an aircraft engine.

BACKGROUND ART

An oxidation-induced self-healing ceramic has the following function: a non-oxide which is dispersed in a ceramic matrix and which has a high activity for oxidation in the high-temperature air (, which is also referred to as a "healing agent" in the present application) is subjected to the reaction of high-temperature oxidation, with the occurrence of a crack during service as a trigger, with oxygen in the air which exists outside the crack, and an oxide produced by the high-temperature oxidation autonomously fills and bonds the crack to recover the strength completely, which is also referred to as a "self-healing function". Therefore, the application of the oxidation-induced self-healing ceramic to a next generation high-temperature structural member for which a high performance and a high degree of safety are required is greatly expected.

As the oxidation-induced self-healing ceramic, for example, a composite of $Al_2O_3$ (alumina) and SiC (, which is also referred to as an "$Al_2O_3$/SiC composite" in the present application), a composite of mullite and SiC (, which is also referred to as a "mullite/SiC composite" in the present application), a composite of zirconia and SiC (, which is also referred to as a "zirconia/SiC composite" in the present application) and a composite of silicon nitride and SiC (, which is also referred to as a "silicon nitride/SiC composite" in the present application) are specifically proposed (see Patent Literatures 1 to 3).

In addition, healing agents such as a MAX phase compound and an intermetallic compound which have a high activity for oxidation at low temperatures are proposed for the purpose of lowering the temperature for the oxidation at high temperatures needed to induce the self-healing (see Non Patent Literatures 1 to 2). As such healing agents, for example, a composite of mullite and $TiSi_2$ (, which is also referred to as a "mullite/$TiSi_2$ composite" in the present application) and a $Ti_3SiC_2$ ceramic are specifically proposed.

Furthermore, there is a report that in a ceramic composite material having a ceramic matrix of alumina wherein the matrix includes a long fiber member of alumina, both the enhanced toughness and the self-healing function of an oxide ceramic are successfully achieved by an oxidation-induced self-healing ceramic in which a healing agent such as SiC is placed at an interface between the matrix and the long fiber (, which is also referred to as an "alumina matrix/healing agent interfacial layer/alumina long fiber composite" in the present application) (see Patent Literature 4).

CITATION LIST

Patent Literature

Patent Literature 1: JP 07-138067 A
Patent Literature 2: JP 11-147769 A
Patent Literature 3: JP 11-147774 A
Patent Literature 4: JP 2012-148963 A

Non Patent Literature

Non Patent Literature 1: Farle et al., "A conceptual study into the potential of $M_{n+1}AX_n$-phase ceramics for self-healing of crack damage", J. Eur. Cer. Soc., 2014 (in press)

Non Patent Literature 2: Yoshioka et al., "Methodology for evaluating self-healing agent of structural ceramics", J. Intelligent Mater. Struct. pp-1045389X14544137, 2014

SUMMARY OF INVENTION

Technical Problem

However, all the conventional oxidation-induced self-healing ceramics have achieved an enhancement of the self-healing function by focusing on only the oxidation reaction between the healing agent and oxygen in the high-temperature atmosphere. The enhancement of the functionality herein is specifically to enhance the velocity necessary for strength recovery and to lower the temperature necessary for crack-healing in a self-healing process. The enhancement of the functionality is essential for completely healing the crack at a high velocity in various specifications and applications (for example, use of a high-temperature structural member at various oxygen partial pressures and operating temperatures) as a high-temperature structural member.

Therefore, there is a limitation to enhance the self-healing function of recovering the strength by autonomously filling and bonding the crack using the conventional oxidation-induced self-healing ceramic in which the enhancement of the functionality is achieved by improving only the high oxidation activity of the healing agent, and there has been a problem that further enhancement of the self-healing function is difficult. Particularly in the case where the oxidation-induced self-healing ceramic is used for a high-temperature structural member such as a low-pressure turbine blade or vane of an air craft engine, further enhancement of the self-healing function has been a big problem. The reason is that the operating condition of the high-temperature structural member is assumed to be in a temperature range of 600° C. to 1200° C., but in the conventional oxidation-induced self-healing ceramics, the temperature at which the self-healing function is effectively exhibited is about 1200° C. to about 1300° C. This temperature range is an extremely limited temperature range and higher than the operating temperature range of 600° C. to 1200° C. In the air craft field, development of an oxidation-induced self-healing ceramic that can completely heal, at a high velocity, a surface crack that has occurred even in the temperature range of 600° C. to 1200° C. has been an urgent problem. The reason is that while a present situation is such that the replacement of a conventional Ni-base superalloy used for low-pressure turbine blades and vanes of an engine with the oxidation-induced self-healing ceramic having a lower specific gravity than the Ni-base superalloy is desired in order to improve a fuel efficiency by reducing the weight of the engine and reducing the cooling air, there is a possibility that when the conventional oxidation-induced self-healing ceramic is used in a turbine part, a surface crack occurs due to foreign object damage (which is also referred to as "FOD" in the present application) arising from collision of a minute foreign object (e.g. sulfide) or the like produced in a combustor with a ceramic at a high velocity, and thereby ruptures the ceramic in the worst case. Incidentally, a current long-fiber-reinforced SiC/SiC composite that is expected as a turbine stator vane material is not designed by focusing on the self-healing function, and therefore it is possible to avoid the rupture due to the FOD temporarily, but it is difficult to inherently secure a stable reliability because the strength of a member is gradually lowered by the accumulation of the collision.

In addition, there has also been a problem that in the conventional oxidation-induced self-healing ceramics using the healing agent such as a MAX phase compound or an intermetallic compound, their strength is extremely low.

Thus, the purpose of the present invention is to newly provide an oxidation-induced, high-functional, self-healing ceramic composition, a method for producing the same, a use of the same, and a method for performing the enhancement of functionality of the same in order to solve the above problems.

Solution to Problem

As a result of diligent studies on a generation mechanism of the self-healing function (, which is also referred to as a "self-healing mechanism" in the present application) of the oxidation-induced self-healing ceramic, the present inventors have firstly found that by comparing the generation mechanism to the self-healing mechanism of the compact bone that constitutes a human body (namely, the self-healing mechanism having three stages of "reactive phase", "reparative phase", and "remodeling phase"), the generation mechanism can be classified into three stages: a stage where the healing agent causes the oxidation reaction (, which is also referred to as the "reactive phase" in the present application); a stage where an oxide produced from the healing agent reacts with a matrix and the like to produce a low-viscosity supercooled melt temporarily and the supercooled melt completely fills a volume of the crack gap (namely, a gap between surfaces of the crack propagating through the grain boundary of matrix and through the interface between the matrix and the healing agent) to bond surfaces of the crack (, which is also referred to as the "reparative phase" in the present application); and a stage where the supercooled melt solidifies or crystallizes to enhance the strength of a crack-healing substance (namely, a substance provided for crack-healing in a crack-healed sample in which strength recovery is completely achieved) filled between the surfaces of the crack or the strength of an interface between a crack-healing substance and the matrix (, which is also referred to as the "remodeling phase" in the present application), and that a strength recovery velocity in the self-healing is controlled by the reparative phase as a rate-determining step.

Further, the present inventors have firstly found that the enhancement of the self-healing function of the oxidation-induced self-healing ceramic can be realized by focusing on the reparative phase and the remodeling phase and conducting element and structural design for speeding up these stages, unlike the conventional method focusing on the reactive phase.

As a result, the present inventors have completed the present invention.

Hereinafter, these findings will be described in detail.

As described above, the present inventors have analyzed the crack-healing mechanism of the oxidation-induced self-healing ceramic in completing the present invention, and have firstly clarified the mechanism.

<Analysis of Crack-Healing Mechanism>

(1) Strength Recovery Behavior by Crack-Healing

FIG. 1 shows results obtained by investigating an influence of healing time ($t_H$) on strength recovery at room temperature of a crack-healed specimen using a composite of $Al_2O_3$ and 30 volume % of SiC (, which is also referred to as an "$Al_2O_3$/30 vol. % SiC composite" in the present application) as one example of $Al_2O_3$/SiC composites that have been known conventionally as the oxidation-induced self-healing ceramic. It is to be noted that "volume %" in the present application is also referred to as "vol. %".

As shown in FIG. 1, it has been confirmed that in the case where the crack-healing temperature ($T_H$) is, for example, 1200° C., the strength of the crack-healed specimen increases as the healing time ($t_H$) increases and recovers completely to a level that is equivalent to the strength of a healed-smooth specimen when the healing time ($t_H$) is 5 hours or more. Moreover, it has also been ascertained that when the healing time ($t_H$) is 5 hours or more, a fracture-initiating point that has existed in a pre-crack transfers outside a crack healed zone. From these results, the present inventors have found that the crack is completely healed in 5 hours at the shortest at a crack-healing temperature ($T_H$) of 1200° C.

In addition, as shown in FIG. 1, the present inventors have found that the shortest time for complete crack-healing ($t_H^{Min}$) increases greatly as the crack-healing temperature ($T_H$) lowers.

Incidentally, the healed-smooth specimen shown in FIG. 1 is prepared by performing a crack-healing treatment under the conditions of 1300° C. for 1 hour on a smooth specimen to which a pre-crack is not introduced and is a specimen in which minute cracks left even on a smooth specimen surface are completely healed. Therefore, the strength of the healed-smooth specimen is improved slightly more than that of the smooth specimen, and the fracture-initiating point is an internal flaw. The method for producing other specimens used in FIG. 1, such as the pre-crack specimen and the smooth specimen, will be described in detail in Reference Example 1 in Examples of the present application.

(2) Multi-Scale Structure Analysis

FIG. 2(a) shows three-dimensional SEM images each showing a state of a crack healed zone in a healing process at a crack-healing temperature ($T_H$) of 1200° C. It is to be noted that a three-dimensional SEM image of a specimen without complete strength recovery in FIG. 2(a) shows an image at a healing time ($t_H$) of 1 hour, which is shorter than the shortest time for complete crack-healing ($t_H^{Min}$) of 5 hours, and a three-dimensional SEM image of a specimen with complete strength recovery in FIG. 2(a) shows an image at a healing time ($t_H$) of 50 hours, which is longer than the shortest time for complete crack-healing ($t_H^{Min}$) of 5 hours.

FIG. 2(b) shows a TEM image of a crack healed zone when the strength recovery was completely achieved at a crack-healing temperature ($T_H$) of 1200° C.

It is to be noted that apparatuses and the like used therein will be described in Reference Example 1 in the Examples of the present application.

As shown in the three-dimensional SEM image of the specimen without complete strength recovery in FIG. 2(a), a non-filling and three-dimensionally connected flaw (which is also referred to as "flaw before reparation" in the present application) exists in the maximum opening of the crack in the crack-healed specimen in the case where the complete strength recovery is not achieved (namely, in the case of "healing time ($t_H$)<shortest time for complete crack-healing ($t_H^{Min}$)"). On the other hand, as shown in the three-dimensional SEM image of the specimen with complete strength recovery in FIG. 2(a), the flaw before reparation further degenerates due to the volume expansion from SiC to $SiO_2$ in the crack healed zone in the case where the complete strength recovery is achieved (namely, in the case where "healing time ($t_H$)≥shortest time for complete crack-healing ($t_H^{Min}$)") to become an extremely minute flaw having a size of approximately 1 μm, which is smaller than the size of the internal flaw that potentially exists in the matrix. From these results, the present inventors have found that the velocity of completely filling a crack to bond surfaces of the crack (, which is also referred to as "crack-filling velocity" or "degeneration velocity of flaw before reparation" in the present specification) is important as a factor to determine a velocity necessary for recovering the strength up to the room-temperature strength, so-called the strength recovery velocity.

Further, as shown in FIG. 2(b), it has been confirmed that the crack-healing substance includes crystallized cristobalite and a slight amount of mullite. It is assumed that this is because a slight amount of $Al_2O_3$ (specifically, the Al element) acts on $SiO_2$ produced through the oxidation of SiC in the crack-healing process to produce an oxide of the low-viscosity supercooled melt, and thereafter two-phase separation occurs. The lowering of the viscosity due to the production of the supercooled melt has also been confirmed from the following fact: in $SiO_2$ of a produced oxide that is produced on the surface of SiC through the oxidation of SiC, formation of bubbles (, which is also referred to as "bubble formation" in the present application) which cannot emerge on the surface and cannot be observed even at approximately 1700° C. as long as the viscosity of $SiO_2$ does not lower sufficiently, has been observed from a surface of an $Al_2O_3$/30 vol. % SiC composite at 1400° C. of a temperature equal to or less than the eutectic point of $SiO_2$ and $Al_2O_3$ by means of an in-situ observation apparatus. As to the bubble formation, the present inventors assume that one factor thereof lies in a local temperature rise due to the production of the supercooled melt of $SiO_2$ containing a slight amount of $Al_2O_3$ and the reaction heat at 1400° C. (specifically, oxidative heat generation).

In addition, it has been ascertained that, as shown in FIG. 2(b), the crystal orientations of SiC and $SiO_2$ are extremely small, the interface between SiC and $SiO_2$ is an interface having a high coherency, and a fine crystal of mullite that is an intermediate compound of $Al_2O_3$ and $SiO_2$ is formed at the interface between $Al_2O_3$ and $SiO_2$.

From these results, the present inventors have found that when the strength recovery is completely achieved in the crack-healing process in the oxidation-induced self-healing ceramic such as the $Al_2O_3$/SiC composite, the healed zone having a high strength and an interface having a high strength between the healed zone and the matrix are formed due to the existence of these crystal phases and the interface having a high coherency.

(3) Modeling of Crack-Healing Mechanism

In view of the above results, the present inventors have found that the crack-healing mechanism of the $Al_2O_3$/SiC composite, when compared it to the self-healing mechanism of the compact bone that constitutes a human body, can be classified into three stages: a stage where SiC causes the oxidation reaction (namely, "reactive phase"); a stage where $SiO_2$ of an oxide produced from SiC reacts with $Al_2O_3$ to produce a low-viscosity supercooled melt temporarily and the supercooled melt completely fills a volume of the crack gap (namely, a gap between surfaces of the crack propagating through the grain boundary of the matrix and through the interface between the matrix and the healing agent) to bond surfaces of the crack (namely, "reparative phase"); and a stage where the supercooled melt solidifies to crystallize, thereby enhancing the strength of a crack-healing substance filled between the surfaces of the crack or the strength of an interface between a crack-healing substance and the matrix ("remodeling phase"), and thereby can modeled as shown in FIG. 3(a).

Each step is specifically as follows.

The reactive phase is a stage where an oxidation reaction of unreacted SiC by contact with oxygen in the air starts with the occurrence of a crack as a trigger to form $SiO_2$, and the temperature between surfaces of the crack locally rises due to its reaction heat.

The reparative phase in terms of a structure is a stage where $SiO_2$ produced through the oxidation of SiC reacts with an adjacent $Al_2O_3$ (matrix) to produce a low-viscosity oxide, and the oxide melts and fills the crack completely as a melt to bond surfaces of the crack. In terms of fracture mechanics, the reparative phase is a stage where the volume of the crack gap is filled to degenerate to the size which is regarded as zero defects.

The remodeling phase is a stage where the low-viscosity oxide melt that fills the volume of the crack gap completely to bond the surfaces of the crack in the reparative phase solidifies to crystallize (, which specifically means that cristobalite of a $SiO_2$ crystal is formed from the interface with SiC which can be a crystal nucleus-producing site, and mullite of an intermediate compound deposits at the interface with $Al_2O_3$), thereby enhancing the strength of the crack-healing substance to achieve the strength recovery completely.

From the viewpoint of structure and fracture mechanics, the present inventors have found that the condition needed to achieve at least complete recovery of the room-temperature strength is that the gap between the surfaces of the crack is completely filled (namely, supercooled melt completely fills a gap between surfaces of the crack to bond its crack surfaces), and therefore the reparative phase corresponding to this condition is a rate-determining step to determine the strength recovery velocity in the crack-healing process. The term "completely filled" herein means that the size of an isolated gap between the surfaces of the crack becomes smaller than the size of an internal flaw that potentially exists in the matrix (namely allowable dimensions for the flaw)

Based on these findings, the present inventors have predicted the room-temperature strength of the crack-healed specimen assuming that the strength recovery velocity in the crack-healing process is controlled by the diffusion velocity of an oxygen molecule or ion, or a CO gas in the low-viscosity oxide produced in the reparative phase. The results are shown as predicted bending strengths ($\sigma_B$) in solid lines in FIG. 1 described previously. As shown in this figure, the predicted values and the measured values of the strength and the shortest time for complete crack-healing ($t_H^{Min}$) of the crack-healed specimens show a good agreement, and therefore it has been confirmed that the above assumption is correct. As a result, it has become clear that in the crack-healing process of the $Al_2O_3$/SiC composite, a slight amount of $Al_2O_3$ (specifically, the Al element) from the matrix acts on $SiO_2$ produced through the oxidation of SiC that is the healing agent to lower the viscosity in the reparative phase that is a rate-determining step to determine the strength recovery velocity, thereby enhancing the diffusion velocity of diffusing species (specifically, an oxygen molecule or ion, or a CO gas) in the supercooled melt comprising $SiO_2$ and $Al_2O_3$ and controlling the velocity of the oxidation reaction of SiC of the healing agent.

<Creation and the Like of Novel Oxidation-Induced Self-Healing Ceramic Composition>

In this way, the present inventors have firstly made clear the crack-healing mechanism of the oxidation-induced self-healing ceramic. Based on the crack-healing mechanism that has been made clear, the present inventors have further found, for the first time, the following: when the crack-filling velocity in the reparative phase that is a rate-determining step to determine the strength recovery velocity in the crack-healing process can be improved (specifically, the diffusion velocity of a substance controlling the velocity of the oxidation reaction of the healing agent can be enhanced), the velocity necessary for the strength recovery is enhanced, so that the enhancement of the functionality of the oxidation-induced self-healing ceramic composition can be realized which has never been achieved so far.

Thus, the present inventors have subsequently focused on the reparative phase that controls the strength recovery velocity in the crack-healing process in the oxidation-induced self-healing ceramic composition and the subsequent remodeling phase to conduct the following: creating a novel, oxidation-induced, high-functional, self-healing ceramic composition; providing a novel method for enhancing the functionality of an oxidation-induced self-healing ceramic composition; and the like. Therefore, the present invention is inherently different from conventional oxidation-induced self-healing ceramic compositions, conventional methods for enhancing the functionality of an oxidation-induced self-healing ceramic composition, and the like each focusing on only the reactive phase in which the healing agent is subjected to high-temperature oxidation by the high oxidation activity of the healing agent in order to enhance the functionality.

The present invention specifically has the following constitution.

(1) According to one aspect of the present invention, an oxidation-induced self-healing ceramic composition comprising: a ceramic matrix; a non-oxide healing agent which is dispersed in the matrix and has oxidation activity; and a healing activator, wherein the healing agent is a substance producing an oxide by contact with external oxygen due to occurrence of a crack in the ceramic composition; and the healing activator is a substance enhancing a diffusion velocity of a substance determining a velocity of an oxidation reaction of the healing agent is provided.

(2) The healing activator herein may be placed at a crystal grain boundary of the matrix and at an interface between the matrix and the healing agent.

(3) In addition, in the oxidation-induced self-healing ceramic composition according to (1) or (2), the matrix may comprise an oxide ceramic.

(4) The oxide ceramic constituting the matrix herein may be alumina or mullite.

(5) In addition, in the oxidation-induced self-healing ceramic composition according to any one of (1) to (4), the healing activator may be a substance lowering, by addition thereof, viscosity of the oxide produced from the healing agent and viscosity of the matrix.

(6) In addition, in the oxidation-induced self-healing ceramic composition according to any one of (1) to (5), the healing activator may comprise at least one metallic oxide satisfying the following conditional expression, namely, "glass transition temperature ($T_g$) of a multi-component system of the oxide produced from the healing agent, the matrix, and the healing activator<a lower limit value of operating temperature range of a high-temperature member to which the oxidation-induced self-healing ceramic is applied".

(7) In the oxidation-induced self-healing ceramic composition according to any one of (1) to (6), the healing agent may be SiC or $TiSi_2$.

(8) In the oxidation-induced self-healing ceramic composition according to any one of (1) to (7), the healing activator may comprise at least one of MgO and MnO.

(9) In the oxidation-induced self-healing ceramic composition according to any one of (1) to (8), an amount of the healing activator added may be more than 0 and 10 volume % or less.

(10) In the oxidation-induced self-healing ceramic composition according to (1), the matrix may comprise a same ceramic as the healing agent dispersed in the matrix and thereby the matrix and the healing agent may be integrated as a single material.

(11) The healing activator herein may be placed at a crystal grain boundary of the single material.

(12) In the oxidation-induced self-healing ceramic composition according to (10) or (11), the healing activator may be a substance lowering, by addition thereof, viscosity of an oxide produced from the single material by contact with the external oxygen due to the occurrence of the crack in the self-healing ceramic composition.

(13) In the oxidation-induced self-healing ceramic composition according to any one of (10) to (12), the healing activator may comprise at least one metallic oxide satisfying the following conditional expression, namely, "glass transition temperature ($T_g$) of a multi-component system of the oxide produced from the single material and the healing activator<a lower limit value of operating temperature range of a high-temperature member to which the oxidation-induced self-healing ceramic is applied".

(14) In the oxidation-induced self-healing ceramic composition according to any one of (10) to (13), the healing agent may be SiC or $TiSi_2$.

(15) In the oxidation-induced self-healing ceramic composition according to any one of (10) to (14), the healing activator may comprise at least one of MgO and MnO.

(16) In the oxidation-induced self-healing ceramic composition according to any one of (10) to (15), an amount of the healing activator added may be more than 0 and 10 volume % or less.

(17) In addition, in the oxidation-induced self-healing ceramic composition according to any one of (1) to (9), when a substance comprising the matrix, the oxide produced from the healing agent, and the healing activator autonomously fills the crack occurred in the ceramic composition to bond surfaces of the crack and further solidifies to crystallize, thereby healing the crack, the oxidation-induced self-healing ceramic composition may further comprise a substance enhancing, by addition, mechanical strength of the substance provided for the crack-healing.

(18) In addition, in the oxidation-induced self-healing ceramic composition according to any one of (10) to (16), when a substance comprising the matrix, the oxide produced from the single material, and the healing activator autonomously fills the crack occurred in the ceramic composition to bond surfaces of the crack and further solidifies to crystallize, thereby healing the crack, the oxidation-induced self-healing ceramic composition may further comprise a substance enhancing, by addition, mechanical strength of the substance provided for the crack-healing.

(19) In the oxidation-induced self-healing ceramic composition according to (17) or (18), the substance enhancing, by the addition thereof, the mechanical strength of the substance provided for the crack-healing may comprise at least one metallic oxide selected from the group consisting of metallic oxide represented by $Y_2O_3$ and lanthanoid series oxides represented by $La_2O_3$, $Ce_2O_3$, $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$.

(20) According to another aspect of the present invention, a method for producing the oxidation-induced self-healing ceramic composition according to any one of (1) to (19), the method comprising: hot-press sintering, under an inert atmosphere, a mixture obtained by adding the healing activator to the matrix and the non-oxide healing agent dispersed in the matrix; and having oxidation activity in air or to a single material in which the matrix and the healing agent are integrated by being made from a same ceramic is provided.

(21) According to another aspect of the present invention, a structural member comprising the oxidation-induced self-healing ceramic composition according to any one of (1) to (19) is provided.

(22) According to yet another aspect of the present invention, a method for improving a strength recovery velocity and a lowering of a crack-healing temperature in a self-healing function of an oxidation-induced self-healing ceramic composition, the method comprising adding a healing activator to a ceramic matrix and a non-oxide healing agent which is dispersed in the matrix and has oxidation activity, wherein the ceramic matrix and the non-oxide healing agent constitute the oxidation-induced self-healing ceramic composition; and a substance producing an oxide by contact with external oxygen due to occurrence of a crack in the self-healing ceramic composition is used as the healing agent; and a substance enhancing a diffusion velocity of a substance determining a velocity of an oxidation reaction of the healing agent is used as the healing activator, thereby improving the strength recovery velocity and lowering the crack-healing temperature in the self-healing function of the oxidation-induced self-healing ceramic composition is provided.

(23) Herein, when a substance comprising the ceramic matrix, the oxide, and the healing activator autonomously fills the crack occurred in the ceramic composition to bond surfaces of the crack and further solidifies to crystallize, thereby healing the crack, the method for improving the strength recovery velocity and the lowering of the crack-healing temperature in the self-healing function may further comprise using a substance enhancing, by addition, mechanical strength of the substance provided for the crack-healing.

Advantageous Effects of Invention

According to the present invention, by focusing on the reparative phase and the remodeling phase, element and structural design for speeding up these stages can be conducted without focusing on the reactive phase in the self-healing process as is conventionally done. Therefore, an oxidation-induced self-healing ceramic composition can be provided in which the strength recovery velocity is enhanced more than that in the conventional oxidation-induced self-healing ceramic compositions in which there is a limitation to enhance the strength recovery velocity by only improving the high oxidation activity of the healing agent in the reactive phase.

Moreover, according to the present invention, the crack-healing temperature can be lowered compared with the conventional oxidation-induced self-healing ceramics.

Therefore, according to the present invention, advantages of improving the strength recovery velocity and the lowering of the crack-healing temperature in the self-healing function, the so-called enhancement of the self-healing function can be achieved in the oxidation-induced self-healing ceramics.

Moreover, according to the present invention, sintering temperature can be lowered, which is necessary in the conventional oxidation-induced self-healing ceramics. For example, according to the present invention, the temperature necessary for densifying the $Al_2O_3$/30 vol. % SiC composite by hot-press sintering (1750° C.) can be lowered to 1550° C. Therefore, production of the ceramic can be conducted easily.

Moreover, according to the present invention, abnormal grain growth during sintering can be suppressed by the addition of the healing activator. Therefore, not only the enhancement of the self-healing function but also the improvement of the strength of the sintered specimen can be achieved.

Moreover, according to the present invention, the healing agent and the healing activator can be separated to be used, and therefore the both can be individually given an appropriate design in accordance with intended uses. Moreover, according to the present invention, in addition to the healing activator developed by focusing on the reparative phase and the remodeling phase in view of facilitation of crystallization by lowering the viscosity and improving the diffusion velocity, a substance for enhancing the mechanical strength of the crack-healing substance may be separately added focusing on only the remodeling phase. Therefore, according to the present invention, the utmost improvement in the functionality can be achieved with even a slight amount of the healing activator.

Moreover, the oxidation-induced self-healing ceramic according to the present invention can be applied to a high-temperature member difficult to effectively provide, by the conventional oxidation-induced self-healing ceramics, the self-healing function for the crack that has occurred, particularly to low-pressure turbine blades and vanes of an air craft.

BRIEF DESCRIPTION OF DRAWINGS

FIG. 4 is a diagram showing the results of in-situ observation for various composites (Al$_2$O$_3$/30 vol. % SiC composite, Al$_2$O$_3$/30 vol. % SiC/0.2 vol. % MgO composite, and Al$_2$O$_3$/30 vol. % SiC/0.2 vol. % MnO composite).

DESCRIPTION OF EMBODIMENTS

Hereinafter, embodiments for carrying out the present invention will be described in detail. It should be noted that the present invention is not limited to the following embodiments and can be also performed by making various modifications within the scope thereof.

An oxidation-induced self-healing ceramic composition and an enhancement of a self-healing function thereof in the present invention comprises a ceramic matrix and a non-oxide healing agent which oxidizes by contact with external oxygen due to the occurrence of a crack in the self-healing ceramic composition as a trigger, and further comprises a healing activator enhancing a diffusion velocity of a substance determining a velocity of the oxidation reaction of the healing agent. This is because the present invention intends to provide the oxidation-induced and high-functional self-healing ceramic composition, a method for enhancing the functionality of the oxidation-induced self-healing ceramic composition, and the like, which have never existed in the past by focusing on the "reparative phase" where a strength recovery velocity in a crack-healing process in the oxidation-induced self-healing ceramic composition is determined and the subsequent "remodeling phase", different from the conventional methods focusing on the "reactive phase".

Figure 1:
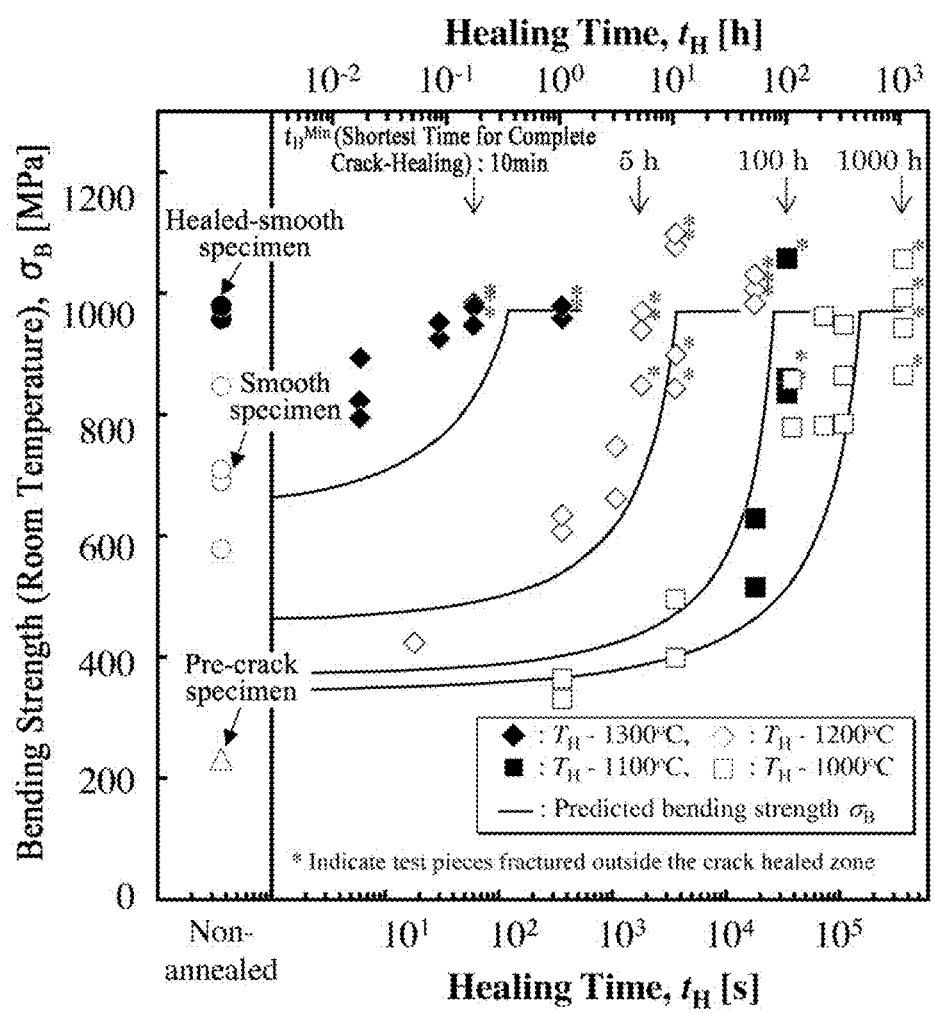
FIG. 1 is a graph showing a relationship between room-temperature bending strength ($\sigma_B$) and healing time ($t_H$) and a relationship between predicted bending strength ($\sigma_B$) and healing time ($t_H$) for various sample specimens (pre-crack specimens, smooth specimens, healed-smooth specimens) with respect to an $Al_2O_3$/30 vol. % SiC composite.
Figure 2:
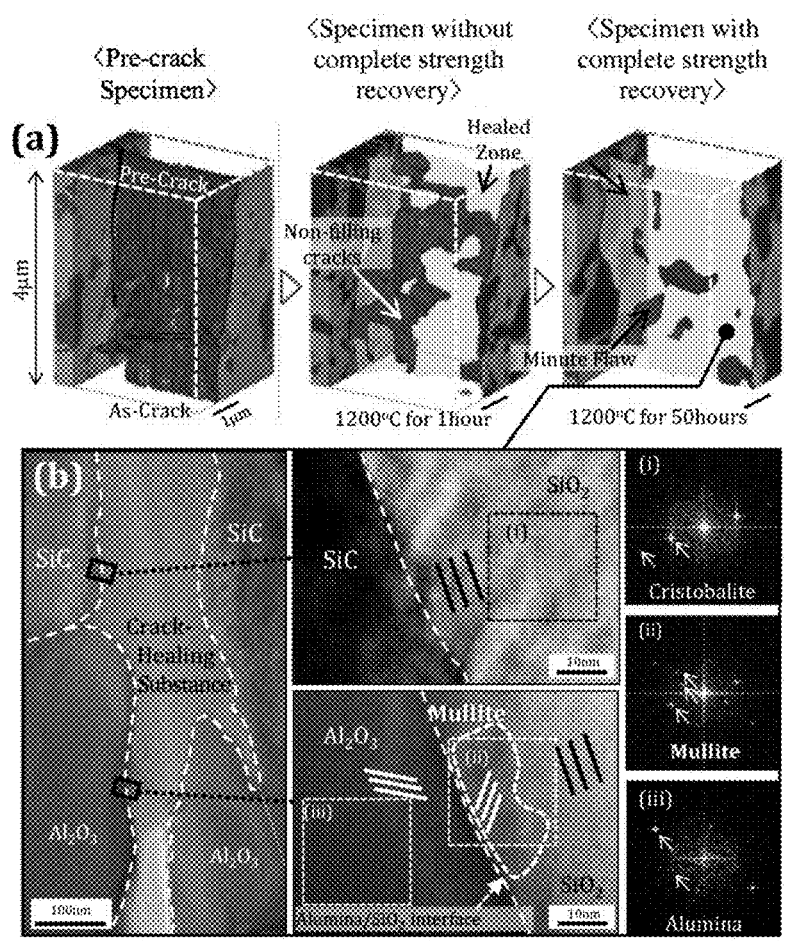
FIG. 2(a) is a diagram showing three-dimensional SEM images which show the states of a crack healed zone in an $Al_2O_3$/30 vol. % SiC composite in a healing process, wherein a crack-healing temperature ($T_H$) is 1200° C.
FIG. 2(b) is a diagram showing TEM images of the crack healed zone in the Al$_2$O$_3$/30 vol. % SiC composite when the strength recovery is completely achieved at a crack-healing temperature (T$_H$) of 1200° C.
Figure 3:
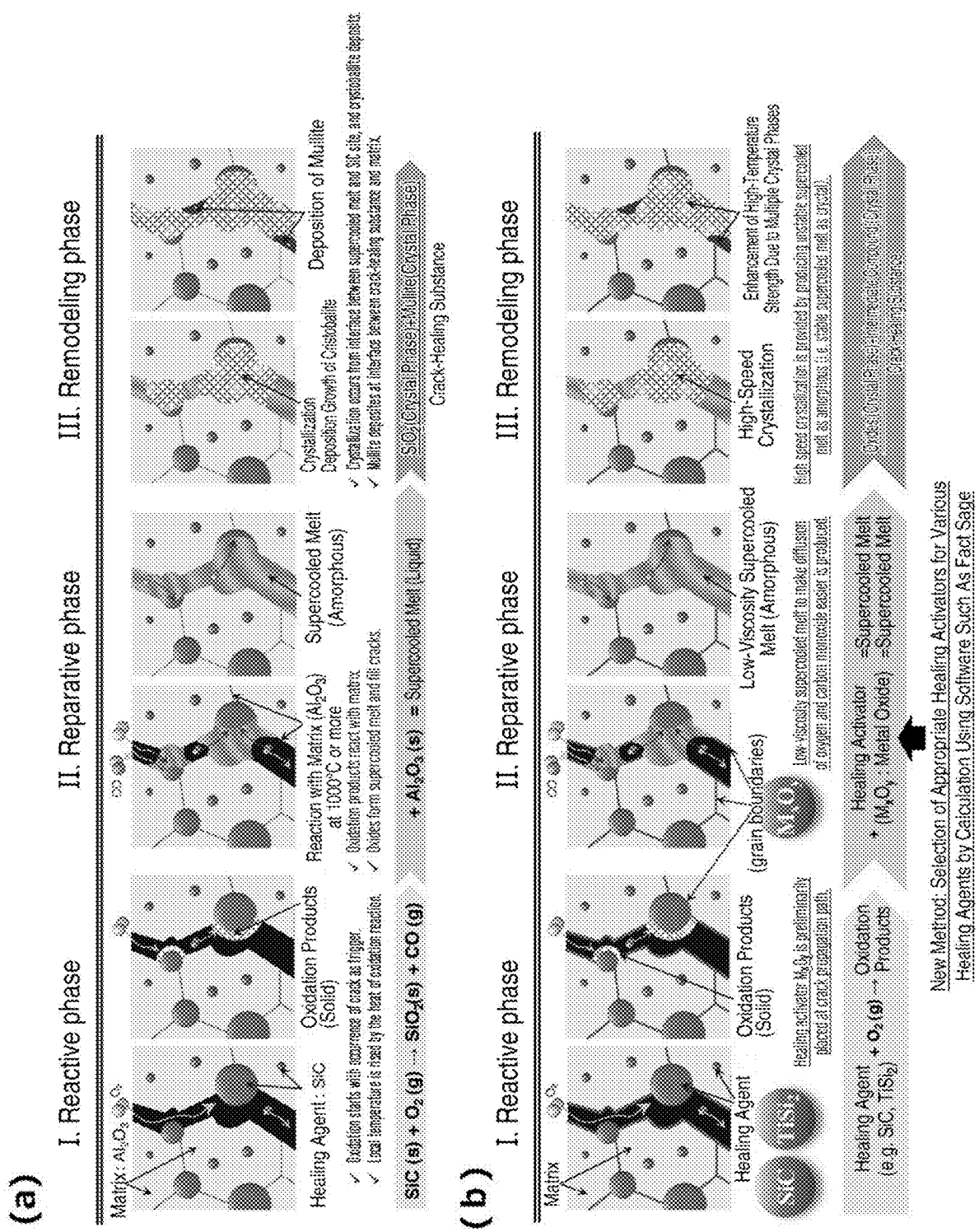
FIG. 3(a) is a diagram illustrating a crack-healing mechanism of an oxidation-induced self-healing ceramic composition which is a conventional composite of Al$_2$O$_3$ and SiC.
FIG. 3(b) is a diagram illustrating a crack-healing mechanism of the oxidation-induced self-healing ceramic composition which is a matrix comprising a healing activator, the matrix being one embodiment of the present invention (herein, a composite of mullite and TiSi$_2$ or a composite of Al$_2$O$_3$ and SiC is referred to as a matrix).

Therefore, as also shown in FIG. 3(b) modeling the self-healing mechanism of the oxidation-induced self-healing ceramic composition of one embodiment of the present invention, there is a huge difference in the "reparative phase" and in the subsequent "remodeling phase", compared with FIG. 3(a) modeling the self-healing mechanism of the conventional oxidation-induced self-healing ceramic composition.

Examples of the ceramic matrix for use in the present invention include ceramics such as oxide ceramics, nitride ceramics, and carbide ceramics, and specific examples thereof include alumina (Al$_2$O$_3$), mullite, silicon nitride (Si$_3$N$_4$), silicon carbide (SiC), and SIALON. As the ceramic matrix, oxide ceramics which are excellent in oxidation resistance are preferable, more preferably alumina and mullite in consideration of the application of the oxide ceramics to a general-purpose high-temperature structural member which is used under a high-temperature oxidation atmosphere. However, the ceramic matrix for use in the present invention is not particularly limited as long as the purposes of the present invention can be achieved.

The healing agent used in the present invention is a non-oxide having a capability of forming an oxide by: contact with oxygen which exists outside due to the occurrence of a crack in the above oxidation-induced self-healing ceramic composition as a trigger; and oxidation reaction with the oxygen.

Therefore, the healing agent is usually in a state of being dispersed in the ceramic matrix, namely in a state of a so-called composite (or composite material). However, a state where the ceramic matrix comprises the same ceramic material as the healing agent, and therefore the ceramic matrix and the healing agent are integrated as a so-called single material is also included therein. Examples of such a state include a case where both the healing agent and the ceramic matrix are formed of the same ceramic material of SiC, and a case where both the healing agent and the matrix are formed of the same TiSi$_2$ material. Moreover, the examples include a long-fiber-reinforced composite in which the healing agent and the ceramic matrix are the same SiC, the composite comprising a SiC long fiber and a SiC matrix each having different shape.

The healing agent is, as described above, the non-oxide having a capability of forming an oxide by contact with oxygen which exists outside and oxidation reaction with the oxygen, and therefore is preferably the non-oxide having a high activity for oxygen which exists outside and undergoing oxidation easily, and in the case where, for example, the healing agent is utilized in the high-temperature atmosphere, the healing agent is preferably the non-oxide having a high activity for oxygen included in the high-temperature atmosphere and undergoing oxidation easily.

As the healing agent, specifically, SiC, TiC, VC, NbC, B$_4$C, TaC, WC, HfC, Cr$_3$C$_2$, ZrC each being a carbide, TiAl-based and Nb—Al-based alloys (for example, Nb$_2$Al, NbAl$_3$) each being an intermetallic compound, or CrSi$_2$, FeSi, MnSi, ZrSi, VSi$_2$, TiSi$_2$ each being a Si intermetallic compound, and substances of MAX phases and the like are preferable. SiC and TiSi$_2$ are preferable in consideration of the application of them to a general-purpose high-temperature structural member. However, the healing agent for use in the present invention is not particularly limited as long as the purposes of the present invention can be achieved.

The healing activator for use in the present invention is a substance enhancing the diffusion velocity of a substance determining the velocity of the oxidation reaction of the healing agent in the reparative phase (specifically, oxidation reaction caused, due to the occurrence of a crack in the oxidation-induced self-healing ceramic composition as a trigger, by the contact of the healing agent dispersed in its matrix with oxygen which exists outside). When the Al$_2$O$_3$/SiC composite is taken as an example, the healing activator is a substance remarkably accelerating (namely, enhancing) the diffusion velocity of an oxygen molecule or ion, or a CO gas in SiO$_2$ that is a substance determining the velocity of the oxidation reaction of SiC being the healing agent, compared with the case where the healing agent is not added, accompanied by the lowering of the viscosity of SiO$_2$ by the addition of the healing activator.

To enhance the diffusion velocity, for example, a substance greatly lowering viscosity ($\eta$) in the following expression by addition is preferable when a Stokes-Einstein equation (Expression 1) that is known as an expression showing a qualitative relationship between the viscosity of an oxide and the diffusion velocity of a diffusing species in the oxide is used.

$$D = k_B T / 6\pi\eta r \quad \text{(Expression 1)}$$

wherein D: diffusion coefficient, $k_B$: Boltzmann constant, T: temperature, $\eta$: viscosity, r: radius of a sphere being diffusion species.

When attention is paid to a eutectic point ($T_E$) and a glass transition temperature ($T_g$) which determine an upper limit of operating temperatures as indices for selecting a viscosity substance lowering the viscosity ($\eta$), specifically, the healing activator comprising at least one metallic oxide satisfying (Expression 2) of the following conditional expressions is preferable, more preferably further satisfying (Expression 3) of the following conditional expressions. The eutectic point ($T_E$) means a eutectic point ($T_E$) in a composition in which the eutectic point ($T_E$) and a melting point ($T_m$) coincide with each other and therefore is also referred to as the eutectic point ($T_E$) (=melting point ($T_m$)) in the present application.

From the viewpoint of the enhancement of the crack-healing function, the healing activator comprising at least one metallic oxide satisfying (Expression 2) of the following conditional expressions is preferable.

Glass transition temperature ($T_g$) of multi-component system of: oxide produced from healing agent; matrix; and healing activator<lower limit value of operating temperatures of high-temperature member to which oxidation-induced self-healing ceramic is applied (Expression 2)

Moreover, from the viewpoint of strength properties at operating temperatures, the healing activator more preferably comprises at least one metallic oxide further satisfying (Expression 3) of the following conditional expressions.

Eutectic point ($T_E$)(=melting point ($T_m$)) of multi-component system of: oxide produced from healing agent; matrix; and healing activator>upper limit value of operating temperatures of high-temperature member to which oxidation-induced self-healing ceramic is applied (Expression 3)

Moreover, in the case where the healing activator comprising at least one metallic oxide satisfying (Expression 2) or both (Expression 2) and (Expression 3) of the above conditional expressions is used as the healing activator, the healing agent satisfying the following conditional expression, namely (Expression 4) is preferable in view of strength properties at operating temperatures.

Eutectic point ($T_E$)(=melting point ($T_m$)) of multi-component system of oxide produced from healing agent and matrix>upper limit value of operating temperatures of high-temperature member to which oxidation-induced self-healing ceramic is applied (Expression 4)

Herein, the terms "upper limit value of operating temperatures" and "lower limit value of operating temperatures" in (Expression 2) to (Expression 4) of the above conditional expressions means the upper limit value and the lower limit value of a temperature distribution that occurs under an operating condition of the member, respectively. This is because a distribution of temperature occurs under an operating condition even in the same member (for example, temperature becomes high at portion near heating section and becomes low at portion far from heating section in same member).

In the state where the ceramic matrix comprises the same ceramic material as the healing agent and therefore the ceramic matrix and the healing agent are integrated as a so-called single material, the healing activator comprising at least one metallic oxide satisfying (Expression 5) of the following conditional expressions, more preferably satisfying (Expression 6) of the following conditional expressions.

Glass transition temperature ($T_g$) of multi-component system of: oxide produced from single material; and healing activator<lower limit value of operating temperatures of high-temperature member to which oxidation-induced self-healing ceramic is applied (Expression 5)

Eutectic point ($T_E$)(=melting point ($T_m$)) of multi-component system of: oxide produced from single material; and healing activator>upper limit value of operating temperatures of high-temperature member to which oxidation-induced self-healing ceramic is applied (Expression 6)

Moreover, in the case where the healing activator comprising at least one metallic oxide satisfying (Expression 5) or both (Expression 5) and (Expression 6) of the above conditional expressions is used as the healing activator, a single material satisfying (Expression 7) of the following conditional expressions is preferable as the above single material where the ceramic matrix and the healing agent are integrated.

Eutectic point ($T_E$)(=melting point ($T_m$)) of oxide produced from single material>upper limit value of operating temperatures of high-temperature member to which oxidation-induced self-healing ceramic is applied (Expression 7)

Herein, the terms "upper limit value of operating temperatures" and "lower limit value of operating temperatures" in (Expression 5) to (Expression 7) of the above conditional expressions means the upper limit value and the lower limit value of a temperature distribution that occurs under an operating condition of the member, respectively. This is because a distribution of temperature occurs under an operating condition even in the same member (for example, temperature becomes high at portion near heating section and becomes low at portion far from heating section in same member).

The healing activator of the metallic oxide having a glass transition temperature satisfying (Expression 2) and (Expression 5) of the above conditional expressions is selected, for example, based on thermodynamic calculation software (for example, FactSage) or the prediction expression proposed by Hui et al. (H. Hui and Y. Zhang, "Toward a general viscosity equation for natural anhydrous and hydrous silicate melts", Geochimica et cosmochimica Acta 71 (2007) 403-416; G. Zhong K. Chou, Measuring and modeling viscosity of CaO—$Al_2O_3$—$SiO_2$(—$K_2O$)melt, Metallugical and Materials Transaction B, 43 (2012) 841-848). Specifically, since the temperature at a viscosity ($\eta$) of $10^{11.3}$ Pa·s is considered as the glass transition temperature, the viscosity of an oxide including the healing activator is calculated using the above software or the above prediction expression to determine a temperature when a viscosity ($\eta$) becomes $10^{11.3}$ Pa·s as the glass transition temperature ($T_g$), thereby selecting the healing activator.

The healing activator comprising at least one metallic oxide satisfying (Expression 3) and (Expression 6) of the above conditional expressions is selected, for example, by figuring out the eutectic point from calculation by the use of the thermodynamic calculation software (FactSage).

Figure 5:
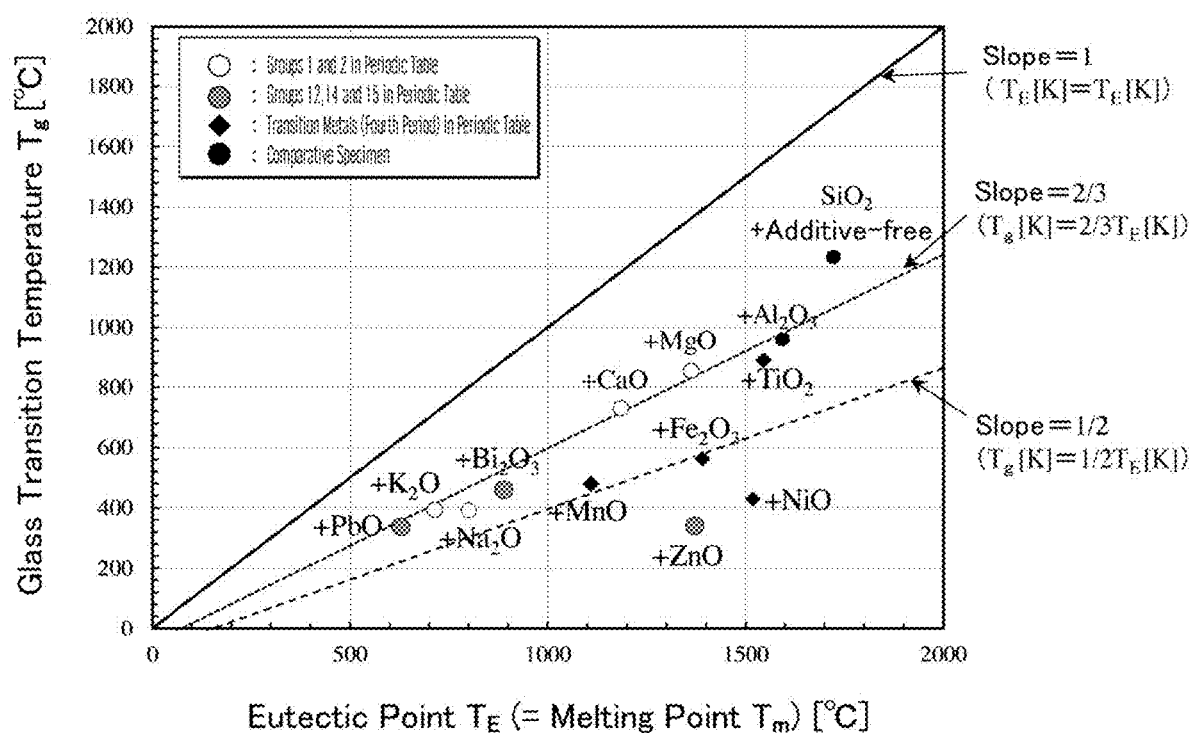
FIG. 5 is a graph showing a relationship between glass transition temperature (T$_g$) and eutectic point (T$_E$) (=melting point (T$_m$)) with respect to various composites in Table 1, wherein the glass transition temperature (T$_g$) is estimated as a composition in which the eutectic point (T$_E$) and the melting point (T$_m$) coincide with each other. It is to be noted that in the present application, the composition of a supercooled melt the production of which is predicted may be represented by the general formula of "lSiO$_2$-mAl$_2$O$_3$-nMxOy".

With respect to, for example, the oxide ($SiO_2$) produced from the healing agent in the $Al_2O_3$/SiC composite, Table 1 in the Examples of the present application shows the results of healing activators (MxOy) satisfying both the glass transition temperature in (Expression 2) of the above conditional expressions and the eutectic point in (Expression 3) of the above conditional expressions, the healing activators selected by the use of: thermodynamic calculation software FactSage Ver. 6.4, phase diagram software Acera-NIST Phase Equilibria Diagrams Version 3.4; and the prediction expression proposed by Hui et al. (H. Hui and Y. Zhang, "Toward a general viscosity equation for natural anhydrous and hydrous silicate melts", Geochimica et cosmochimica Acta 71 (2007) 403-416; G. Zhong K. Chou, Measuring and modeling viscosity of CaO—$Al_2O_3$—$SiO_2$(—$K_2O$)melt, Metallugical and Materials Transaction B, 43 (2012) 841-848). FIG. 5 shows the results in this table as the relationship between the glass transition temperature ($T_g$) and the eutectic point ($T_E$) (=melting point ($T_m$)).

It is considered that the temperature region of crack-healing temperature ($T_H$) where an effective self-healing function is exhibited is in a range of eutectic point ($T_E$) (=melting point ($T_m$))>crack-healing temperature ($T_H$) >glass transition temperature ($T_g$), and therefore it is preferable to set the lower limit and upper limit values of the operating temperatures of a member to be within a range between the eutectic point ($T_E$) (=melting point ($T_m$)) and the glass transition temperature ($T_g$).

As shown in FIG. 5, with respect to the healing activator, a relationship of $T_g$ [K]=⅔ $T_E$ [K: Kelvin] to ½ $T_E$ [K] (or $T_g$ [K]=⅔ $T_m$ [K] to ½ $T_m$ [K]) holds generally, and therefore it can be estimated that the glass transition temperature ($T_g$) of the healing activator is approximately in a range of $T_g$ [K]=⅔ $T_E$ [K] to ½ $T_E$ [K] (or $T_g$ [K]=⅔ $T_m$ [K] to ½ $T_m$ [K]). Therefore, by the use of this relationship, it is possible to estimate $T_g$ of healing activators of which only the eutectic point is known and of which the glass transition temperature ($T_g$) cannot be acquired from thermodynamic calculation and references. In the case where two or more metallic oxides selected as the healing activator exist, the metallic oxides which are expected to be able to enhance the healing function without lowering the high-temperature strength of a member are preferable.

In (Expression 2) to (Expression 7) of the above conditional expressions, the upper limit value and the lower limit value of the operating temperatures of the high-temperature member to which the oxidation-induced self-healing ceramic is applied refer to the crack-healing temperature ($T_H$), and in consideration of the application to a high-temperature structural member such as a low-pressure turbine 1st stage blade or vane of an aircraft engine, it is preferable to select the healing activator so that the effective self-healing function can be exhibited in a temperature range of approximately 1200° C. and approximately 1050° C. for the upper limit value and the lower limit value, respectively, of the operating temperatures during take-off and cruising. In consideration of the application to high-temperature structural members such as low-pressure turbine 2nd to 5th stage blades and vanes of an aircraft engine, it is preferable to select the healing activator so that the effective self-healing function can be exhibited in a temperature range of approximately 1050° C. and approximately 600° C. for the upper limit value and the lower limit value, respectively, of the operating temperatures during take-off and cruising. However, the upper limit value and the lower limit value of the operating temperatures of the high-temperature member to which the oxidation-induced self-healing ceramic is applied can be selected arbitrarily according to the purpose of use, and are not particularly limited as long as the purposes of the present invention can be achieved.

Examples of the healing activator include MgO and MnO, and these are particularly preferable when added to a ceramic composition such as the $Al_2O_3$/SiC composite or the mullite/$TiSi_2$ composite. Among others, MnO is more preferably added to the $Al_2O_3$/SiC composite. This is because the viscosity of the oxide which derives from the healing agent capable of contributing to completely filling the crack that has occurred and bonding the crack surfaces, and the viscosity of the composite oxide with the matrix can be effectively lowered by the addition thereof.

Figure 6:
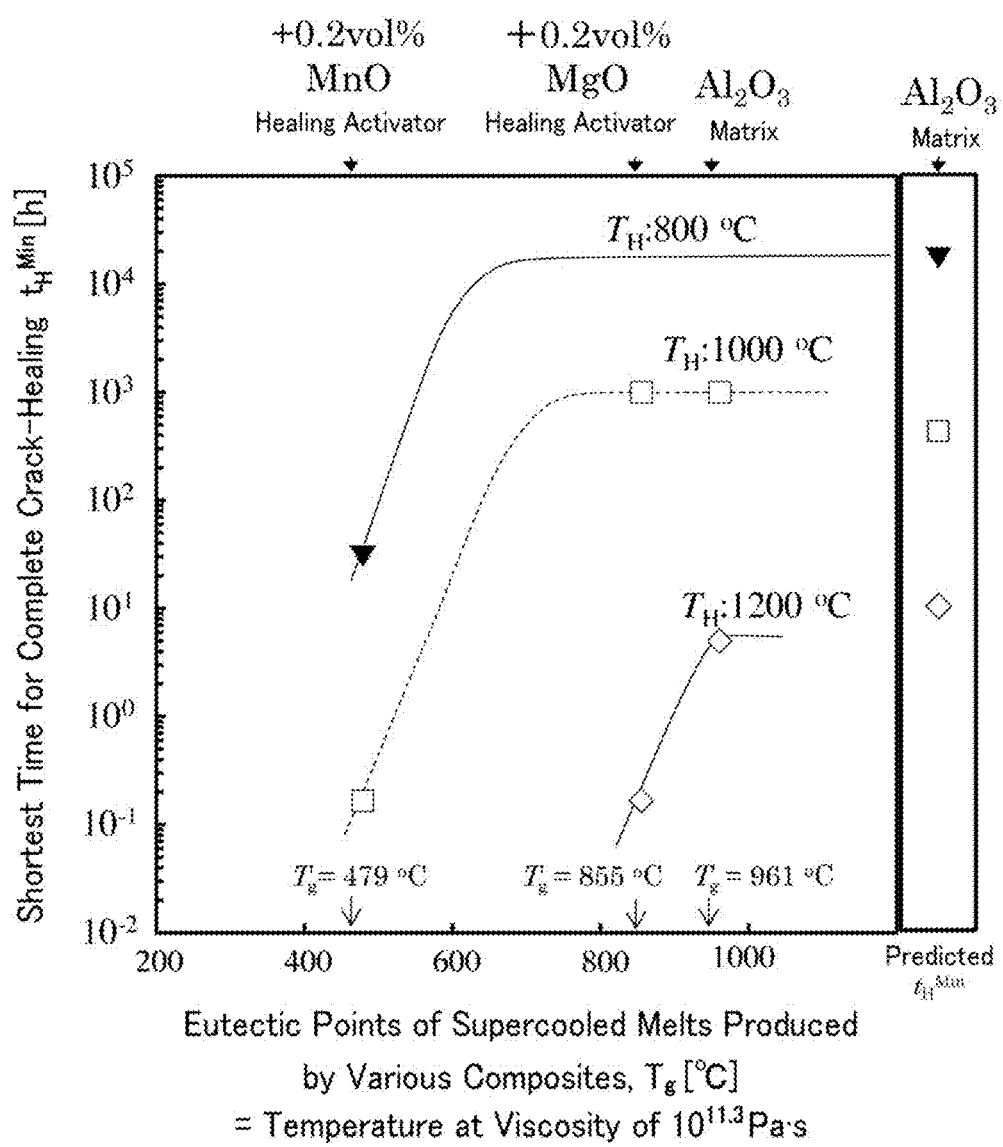
FIG. 6 is a graph showing a relationship between glass transition temperature (T$_g$) (=temperature at viscosity of 10$^{11.3}$ Pa·s) and shortest time for complete crack-healing (t$_H^{Min}$) for supercooled melts produced in various composites (Al$_2$O$_3$/30 vol. % SiC composite, Al$_2$O$_3$/30 vol. % SiC/0.2 vol. % MgO composite, and Al$_2$O$_3$/30 vol. % SiC/0.2 vol. % MnO composite). It is to be noted that in the right frame of FIG. 6, each shortest time for complete crack-healing (t$_H^{Min}$) at 800° C., at 1000° C. and at 1200° C. calculated from an predicted expression of crack-healing, the predicted expression separately derived from theoretical analysis of the crack-healing by the present inventors is additionally described as a predicted shortest time for complete crack-healing (t$_H^{Min}$).
Figure 8:
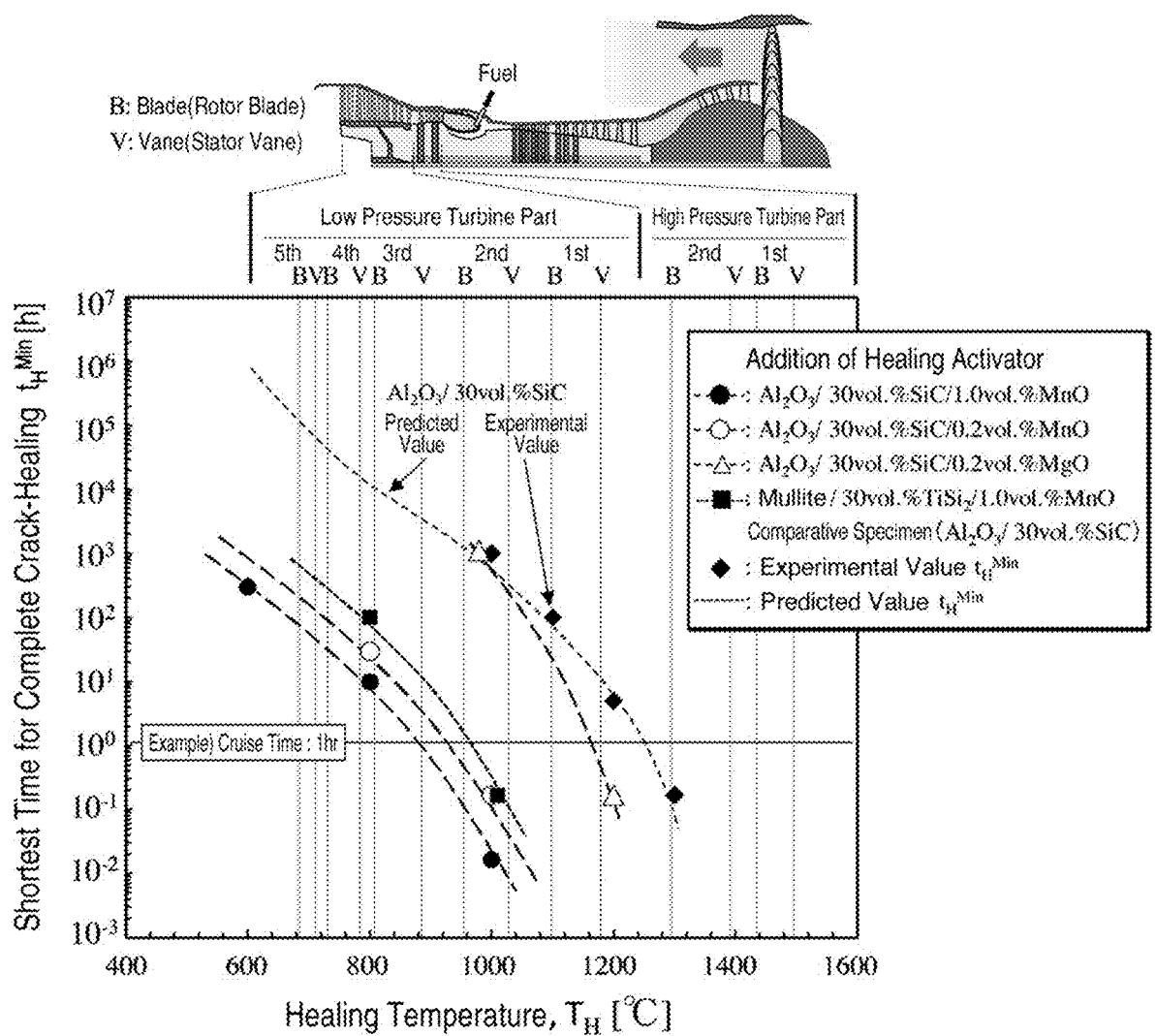
FIG. 8 is a graph showing a relationship between shortest time for complete crack-healing (t$_H^{Min}$) and healing temperature (T$_H$) for various composites (Al$_2$O$_3$/30 vol. % SiC/0.1 vol. % MnO composite, Al$_2$O$_3$/30 vol. % SiC/0.2 vol. % MnO composite, Al$_2$O$_3$/30 vol. % SiC/0.2 vol. % MgO composite, and mullite/30 vol. % TiSi$_2$/1.0 vol. % MnO composite) in which a healing activator is added, each being one embodiment of the present invention, by comparison with a conventional Al$_2$O$_3$/30 vol. % SiC composite to which a healing activator is not added, the figure accompanied by comparison with operating temperatures of turbine vanes (stator vanes) and blades (rotor blades) for an aircraft engine.

FIG. 6 shows the relationship between the glass transition temperature ($T_g$) (=temperature at viscosity of $10^{11.3}$ Pa·s) and the shortest time for complete crack-healing ($t_H^{Min}$) for supercooled melts produced in various composites ($Al_2O_3$/30 vol. % SiC composite, $Al_2O_3$/30 vol. % SiC/0.2 vol. % MgO composite, and $Al_2O_3$/30 vol. % SiC/0.2 vol. % MnO composite), and FIG. 8 shows a graph which shows the relationship between the shortest time for complete crack-healing ($t_H^{Min}$) and the healing temperature ($T_H$) for various composites ($Al_2O_3$/30 vol. % SiC/0.1 vol. % MnO composite, $Al_2O_3$/30 vol. % SiC/0.2 vol. % MnO composite, $Al_2O_3$/30 vol. % SiC/0.2 vol. % MgO composite, and mullite/30 vol. % $TiSi_2$/1.0 vol. % MnO composite) to which a healing activator is added by comparison with the relationship between the shortest time for complete crack-healing ($t_H^{Min}$) and the healing temperature ($T_H$) for the conventional $Al_2O_3$/30 vol. % SiC composite to which a healing activator is not added, and FIG. 8 is accompanied by comparison with the operating temperatures of turbine vanes (stator vanes) and of blades (rotor blades) for an aircraft engine.

According to FIG. 6 and FIG. 8, the shortest time for complete crack-healing ($t_H^{Min}$) obtained in a temperature region of 600 to 1200° C. as the operating temperatures (namely, crack-healing temperatures ($T_H$)) of the $Al_2O_3$/SiC composite is greatly shortened as the glass transition temperature ($T_g$) is lowered by each addition of MgO and MnO as the healing activator. Particularly in the case where 0.2 vol. % of MnO of the healing activator is added, the shortest time for complete crack-healing ($t_H^{Min}$) is less than 10 min at 1000° C. and 30 hours at 800° C., which have been shortened to be less than 1/6000 times shorter and 1/547 times shorter, respectively, compared with the shortest time for complete crack-healing ($t_H^{Min}$) predicted in the case where MnO is not added. In addition, in the case where 1.0 vol. % of MnO being the healing activator is added, the shortest time for complete crack-healing ($t_H^{Min}$) obtained in a temperature region of 600° C. to 1000° C. as the operating temperatures (namely, crack-healing temperatures ($T_H$)) of the $Al_2O_3$/SiC composite is less than 1 min at 1000° C., 10 hours at 800° C., and 300 hours at 600° C., which have been shortened to be less than 1/60000 times shorter, 1/1640 times shorter, and 1/2287 times shorter, respectively, compared with the shortest time for complete crack-healing ($t_H^{Min}$) predicted in the case where MnO is not added.

Incidentally, for example, when the upper limit value and the lower limit value of the operating temperatures during take-off and cruising are assumed to be approximately 1200° C. and approximately 1050° C. in the low-pressure turbine 1st stage blades and vanes, examples of the healing activator (MxOy) satisfying both the glass transition temperature in (Expression 2) of the above conditional expressions and the eutectic point in (Expression 3) of the above conditional expressions for the oxide ($SiO_2$) produced from the healing agent in the $Al_2O_3$/SiC composite include MgO, $TiO_2$, ZnO, $Fe_2O_3$, and NiO as shown in Table 1 and FIG. 5, and MgO is included therein.

Further, for example, when the upper limit value and the lower limit value of the operating temperatures during take-off and cruising are assumed to be approximately 1050° C. and approximately 600° C. in the low-pressure turbine 2nd to 5th stage blades and vanes, examples of the healing activator (MxOy) satisfying both the glass transition temperature in (Expression 2) of the above conditional expressions and the eutectic point in (Expression 3) of the above conditional expressions for the oxide ($SiO_2$) produced from the healing agent in the $Al_2O_3$/SiC composite include ZnO, MnO, $Fe_2O_3$, and NiO as shown in Table 1 and FIG. 5, and MnO is included therein.

When a plurality of metallic oxides selected as the healing activator exist, these may be used singly or in a combination of (namely, by mixing) two or more. The reason why two or more may be combined is that, when (Expression 2) and (Expression 3) of the above conditional expressions are taken as an example, (Expression 2) or both (Expression 2) and (Expression 3) of the above conditional expressions have only to be satisfied in a combination of the two or more metallic oxides.

For example, as the healing activator, MgO and MnO may be used as the metallic oxide singly or in a combination of the two. Even though each of MgO and MnO does not satisfy (Expression 2), or (Expression 2) and (Expression 3) of the above conditional expressions singly, the combination of the two, or a combination with another metallic oxide can satisfy (Expression 2) or both (Expression 2) and (Expression 3) of the above conditional expressions.

In consideration of the facts that the upper limit value and the lower limit value of the operating temperatures of the low-pressure 1 st stage turbine stator vane (vane) and rotor blade (blade) of an aircraft engine are approximately 1200° C. and approximately 1050° C., respectively, and the upper limit value and the lower limit value of the 2nd to 5th stage blades and vanes are approximately 1050° C. and approximately 600° C., respectively, each of MgO and MnO is a particularly preferred healing activator in the application to high-temperature structural members such as 1st stage low-pressure blades and vanes and 2nd to 3rd stage low-pressure blades and vanes, as shown in FIG. 8.

In addition, as shown in FIG. 8, MnO is a particularly preferred healing activator in the application in a temperature range of approximately 890° C. to approximately 1030° C., the temperature range being further limited as the operating temperatures in the high-temperature structural members such as a 2nd stage low-pressure turbine stator vane (vane) and rotor blade (blade) and a 3rd stage turbine stator vane of a CF6 engine.

It is preferable that the healing activator for use in the present invention (, which is also referred to as "MxOy" in present application) is placed at a crystal grain boundary of the matrix and at an interface between the matrix and the healing agent, which can each be the propagation path of the crack, in that the viscosity of the composite oxide from the healing agent is effectively lowered from the viewpoint of the texture. In this case, when the ceramic matrix comprises the same ceramic material as the healing agent and therefore the two are integrated as a so-called single material, it is preferable that the healing activator is placed at the crystal grain boundary of the single material.

In addition, in the case where an M element that constitute MxOy of the healing activator is inevitably mixed during production of a raw material powder for the healing agent, the mixed M element may be used as it is as a raw material for the healing activator.

Even when the amount of the healing activator for use in the present invention added is slight, the maximum enhancement of the healing velocity can be achieved, and specifically, the amount of the healing activator added is preferably more than 0 and 10 volume % or less, more preferably more than 0 and 9 volume % or less, still more preferably more than 0.01 and 3.0 volume % or less, and further still more preferably 0.2 or more and 1.0 volume % or less.

In the case where the healing activator (for example, MgO or MnO) is added to the ceramic composition (for example, Al$_2$O$_3$/SiC composite), when the additive amount of the healing activator is in a range of more than 0 and 0.2 volume % or less, the healing activator is easily placed at the grain boundary and is uniformly placed with ease even at a macro-level.

However, the additive amount of the healing activator is not particularly limited as long as the purposes of the present invention can be achieved.

According to the healing activator for use in the present invention, the diffusion velocity of a substance determining the velocity of the oxidation reaction of the healing agent in the reparative phase is enhanced, thereby facilitating autonomous filling of the crack occurred in the ceramic composition and bonding of the crack surfaces. However, the complete recovery of the strength is, as also shown in FIG. 3(b), achieved by, in the remodeling phase after the reparative phase, filling space between crack surfaces with the oxide having a low viscosity melt, bonding the crack surfaces, and further solidifying to crystallize.

Therefore, a substance making the crystallization in the remodeling phase easy may further be added from the viewpoint of further facilitating the strength recovery velocity. In other words, a substance facilitating the crystallization of oxide having a low-viscosity melt, the oxide filling space between crack surfaces formed and bonding the crack surfaces in the reparative phase (namely, a crack-healing substance) may be added.

The crystallization of amorphous or a supercooled melt is facilitated in the temperature region between the melting point ($T_m$) and the glass transition temperature ($T_g$). Further, it is known that the lower the transition temperature ($T_g$) is, the less thermodynamically stable the amorphous is, and therefore the lower the glass transition temperature ($T_g$) is, the more the crystallization velocity of the amorphous is enhanced. For example, in the case where SiO$_2$ is produced from the healing agent, such as SiC, through oxidation, crystallization velocity in the remodeling phase following the reparative phase is more facilitated, compared with the conventional specimens, even by the addition of every healing activator, as shown in Table 1.

Examples of the specific substance making the crystallization in the remodeling phase easy include MgO and MnO which can be used as the healing activator for use in the present invention.

However, the substance making the crystallization in the remodeling phase easy is not particularly limited as long as the purposes of the present invention can be achieved.

In consideration of the uses as a high-temperature structural member, the crack-healing substance (crystal phase) finally formed between the crack surfaces through the reactive phase, the reparative phase, and the remodeling phase each being an elementary process of the crack-healing reaction is preferably one enhancing the mechanical properties of the high-temperature structural member. In this case, it is preferable to further add a substance separately, the substance selected by focusing on the enhancement of the strength of the crack-healing substance in the remodeling phase (, which specifically means enhancement of mechanical properties of the crack-healing substance) in addition to the healing activator (MxOy) selected by focusing on upgrading in the above reparative phase (, which specifically means that the viscosity is lowered to enhance the diffusion velocity, thereby facilitating crystallization). The substance selected by focusing on the enhancement of the strength of the crack-healing substance in the remodeling phase includes a substance also having effects exhibited by the healing activator (MxOy) selected by focusing on the upgrading in the above reparative phase. In selecting a substance focusing on only the remodeling phase (namely, a substance selected by focusing on the enhancement of the strength of the crack-healing substance in the remodeling phase), a substance not performing the role of the healing activator selected by focusing on the upgrading in the above reparative phase is desirable.

As the substance selected by focusing on the enhancement of the strength of the crack-healing substance in the remodeling phase, it is preferable to add at least one metallic oxide selected from the group consisting of metallic oxide represented by Y$_2$O$_3$ and lanthanoid series oxides represented by La$_2$O$_3$, Ce$_2$O$_3$, Pr$_2$O$_3$, Nd$_2$O$_3$, Pm$_2$O$_3$, Sm$_2$O$_3$, Eu$_2$O$_3$, Gd$_2$O$_3$, Tb$_2$O$_3$, Dy$_2$O$_3$, Ho$_2$O$_3$, Er$_2$O$_3$, Tm$_2$O$_3$, Yb$_2$O$_3$, and Lu$_2$O$_3$ simultaneously with the healing activator (MxOy) selected by focusing on the upgrading in the above reparative phase. In the case where these Y or lanthanoid series oxides are added, for example, MnO is given as the preferred healing activator (MxOy) selected by focusing on the upgrading in the above reparative phase.

A method for adding the substance with which the improvement in the mechanical properties of the crack-healing substance produced in the remodeling phase is achieved (namely, the above described substance selected by focusing on the enhancement of the strength of the crack-healing substance in the remodeling phase) is not particularly limited as long as the purposes of the present invention can be achieved. However, from the viewpoint of the structure, it is preferable to add the substance in the same way as the healing activator (MxOy) selected by focusing on the reparative phase so as to be placed at the crystal grain boundary of the matrix and at the interface between the matrix and the healing agent, each of which can be the propagation path of the crack. In this case, when the ceramic matrix comprises the same ceramic material as the healing agent and therefore the two are integrated as a so-called single material, it is preferable that the healing activator is placed at the crystal grain boundary of the single material.

Also, even when the amount of the healing activator with which the improvement in the mechanical properties of the crack-healing substance produced in the remodeling phase added is slight, the maximum enhancement of the healing velocity can be achieved, and specifically, the amount of the healing activator added is preferably more than 0 and 10 volume % or less, more preferably more than 0 and 9 volume % or less, still more preferably more than 0.01 and 3.0 volume % or less, and further still more preferably 0.2 or more and 1.0 volume % or less. However, there are no particular limitations as long as the purposes of the present invention can be achieved.

With respect to the conditions not specified in the present application, there are no particular limitations as long as the purposes of the present invention can be attained.

EXAMPLES

Next, the embodiments of the present invention will be described more specifically giving the following Examples, however, the embodiments of the present invention are not limited to these Examples as long as they are within the scope of the present invention.

First, conditions for implementation in the "Analysis of Crack-Healing Mechanism" described above will be described below in detail.

Reference Example 1

[Conditions for Implementation in Analysis of Crack-Healing Mechanism]

An $Al_2O_3$/30 vol. % SiC composite was used as a sample specimen. In preparing this sample specimen, AKP-50 manufactured by Sumitomo Chemical Company Limited was used as an alumina powder, and "Ultrafine" manufactured by IBIDEN CO., LTD. was used as a silicon carbide powder. These powders were subjected to wet mixing in 2-propanol for 24 hours using balls and a mill pod which are made of alumina. The mixed powder was dried in the air for 6 hours, and then hot-press sintered, under prescribed conditions (namely, atmosphere: Ar gas, retention temperature: 1750° C., load pressure: 40 MPa, retention time: 1 hour, velocity of temperature rise: 10° C./min, velocity of temperature drop: 5° C./min), to prepare a 50×50×6 mm sintered body. From the obtained sintered body, 3×4×44 mm and 3×4×22 mm bending test pieces were prepared. The test piece surfaces were subjected to mirror polish finishing according to JIS R 1601. These test pieces were used as a smooth specimen.

A semi-elliptical crack (pre-crack) having a surface length of about 110 μm was introduced to the smooth specimens using a Vickers hardness meter to perform heat treatment under prescribed conditions (namely, crack-healing temperature ($T_H$): 1000° C. to 1300° C., healing time ($t_H$): 0.1 hour to 1000 hours, atmosphere: in air).

The strengths of the test pieces were evaluated by a room-temperature three-point bending test method. The evaluation of strengths of pre-crack specimens and crack-healed specimens here was performed at a span length of 30 mm and of 16 mm. RTF-1310 manufactured by A&D Company, LTD. was used as a bend tester.

High-temperature oxidation behavior of SiC, a three-dimensional micro-structure in the periphery of a crack healed zone, and the compositions and crystal structures of crack-healing substances were analyzed using the in-situ observation apparatus, orthogonal type scanning electron microscope-focused ion beam processing apparatus (FIB-SEM) (SMF-1000: manufactured by Hitachi High-Technologies Corporation), and transmission electron microscope (TEM) (JEM-3100FEF: manufactured by JEOL Ltd.), respectively.

Next, one example of the present embodiments will be described.

Example 1

[Preparation of $Al_2O_3$/30 vol. % SiC/0.2 vol. % MgO Composite and $Al_2O_3$/30 vol. % SiC/0.2 vol. % MnO Composite]

According to the method of Reference Example 1, $Al_2O_3$ was compounded with 30 vol. % of SiC, and then compounded with 0.2 vol. % of a MgO powder to prepare a composite of $Al_2O_3$, 30 vol. % of SiC, and 0.2 vol. % of MgO (, which is also referred to as an "$Al_2O_3$/30 vol. % SiC/0.2 vol. % MgO composite" in present application).

Moreover, according to the method of Reference Example 1, $Al_2O_3$ was compounded with 30 vol. % of SiC and then compounded with 0.2 vol. % of a MnO powder to prepare a composite of $Al_2O_3$, 30 vol. % of SiC, and 0.2 vol. % of MnO (, which is also referred to as an "$Al_2O_3$/30 vol. % SiC/0.2 vol. % MnO composite" in present application).

Specifically, the $Al_2O_3$/30 vol. % SiC/0.2 vol. % MgO composite was prepared by: mixing an $Al_2O_3$/30 vol. % SiC powder and 0.2 vol. % of the MgO powder as a raw material powder; and hot-press sintering the mixture. Also, the $Al_2O_3$/30 vol. % SiC/0.2 vol. % MnO composite was prepared by: mixing an $Al_2O_3$/30 vol. % SiC powder and 0.2 vol. % of the MnO powder as a raw material powder; and hot-press sintering the mixture. The retention temperatures in the sintering for making these two composites were 1700° C. for the former and 1550° C. for the latter for the purpose of segregating the healing activator at the grain boundary of the matrix. In addition, the sintering conditions other than the retention temperatures were unified by the prescribed conditions (namely, atmosphere: Ar gas, load pressure: 40 MPa, retention time: 1 hour, velocity of temperature rise: 10° C./min, velocity of temperature drop: 5° C./min). It is to be noted that the above described sintering conditions were selected to be the conditions suitable to segregate the healing activator at the grain boundary of the matrix.

The MgO powder and the MnO powder which are respectively manufactured by Xuan Cheng Jing Rui New Material Co. Ltd. and Kojundo Chemical Laboratory Co., Ltd. were used. The MgO powder has an average particle diameter of 0.25 μm, a purity of 99.9%, and a density of 3.585 g/cm³ and contained 200 ppm of Ca, 30 ppm of K, 30 ppm of Fe, 80 ppm of Na, 10 ppm of Cu, and 10 ppm of Pb as impurities, and the MnO powder has an average particle diameter of 5 μm to 10 μm, a purity of 99.9%, and a density of 5.36 g/cm³ and contained 100 ppm of Ca, 60 ppm of Co, 100 ppm of Mg, 100 ppm of Na, and 10 ppm of Si as impurities. It is to be noted that the mixed powders which are as fine as possible were selected among commercially available powders so as to be dispersed further uniformly by making distances between particles as small as possible.

From the obtained sintered body, 3×4×44 mm and 3×4×22 mm bending test pieces were prepared. The test piece surfaces were subjected to mirror polish finishing according to JIS R 1601. These test pieces were each used as a smooth specimen.

A semi-elliptical crack having a surface length of about 100 μm was introduced to the smooth specimens using the Vickers hardness meter, and the resultant specimens were used as a pre-crack specimen.

[In-Situ Observation of $Al_2O_3$/30 Vol. % SiC/0.2 Vol. % MgO Composite and $Al_2O_3$/30 Vol. % SiC/0.2 Vol. % MnO Composite]

Heat treatment was performed on the pre-crack specimens obtained in the above [Preparation of $Al_2O_3$/30 vol. % SiC/0.2 vol. % MgO Composite and $Al_2O_3$/30 vol. % SiC/0.2 vol. % MnO Composite] in the in-situ observation apparatus at a high temperature of 800° C. to 1350° C. It is to be noted that a high-temperature observation stage for a microscope manufactured by YONEKURA MFG Co., Ltd. was used as the in-situ observation apparatus. Heating was performed by a lamp light collection method, and the observation was performed with an optical microscope. Healing treatment was performed on the periphery of the pre-crack by a lamp light collection heating method setting the velocity of temperature rise at 50° C./min until the temperature reached 1000° C. and 20° C./min at a temperature equal to or more than 1000° C., and the state of the healing treatment was observed at the above high temperature.

The results of the in-situ observation are shown in FIG. 4.

The enhancement of the velocity of oxide production and the lowering of the oxide production temperature were confirmed at each sample surface for both the $Al_2O_3$/30 vol. % SiC/0.2 vol. % MgO composite and the $Al_2O_3$/30 vol. % SiC/0.2 vol. % MnO composite by comparison with the conventional specimen, the $Al_2O_3$/30 vol. % SiC composite.

As shown in FIG. 4, in the conventional specimen, even when the temperature was raised to 1350° C., the amount of the oxide produced was slight, and the pre-crack can be confirmed sufficiently with the optical microscope. On the other hand, in the $Al_2O_3$/30 vol. % SiC/0.2 vol. % MgO composite, it was confirmed that the oxide was produced in large quantity, and the crack disappeared even at 1350° C. Further, in the $Al_2O_3$/30 vol. % SiC/0.2 vol. % MnO composite, it was confirmed that a sufficient amount of the oxide were produced and the crack completely disappeared even at 1000° C. These results show that the healing activator is extremely useful for the enhancement of the healing velocity and the lowering of the healing temperature.

Moreover, local bubble formation was confirmed from both the surface oxide of the $Al_2O_3$/30 vol. % SiC/0.2 vol. % MgO composite and the surface oxide of the $Al_2O_3$/30 vol. %/SiC/0.2 vol. % MnO composite at 1250° C. and at 800° C. The bubble formation temperatures were extremely lower than the bubble formation temperature of 1400° C. in the $Al_2O_3$/30 vol. % SiC composite. Also, it was confirmed that when the temperature was further raised, the bubble formation which had locally occurred came to be seen in the entire surface of the test pieces. The overall bubble formation temperature was about 1350° C. (specifically, 1330° C.) for the $Al_2O_3$/30 vol. % SiC/0.2 vol. % MgO composite and 1000° C. for the $Al_2O_3$/30 vol. % SiC/0.2 vol. % MnO composite.

Accordingly, it was found that the above enhancement of the velocity of oxide production and the above lowering of the oxide production temperature are obtained for the following reason: the diffusion velocity of gas-phase species in the oxide is improved due to a function of MnO and MgO of the healing activator, the function lowering the viscosity of the oxide; and as a result, the velocity of the oxidation of SiC is enhanced and the oxidation temperature of SiC is lowered.

[Selection of Healing Activators Through Thermodynamic Calculation]

As described above, as the healing activator enhancing the diffusion velocity, for example, a substance greatly lowering the viscosity (η) in the above Stokes-Einstein equation (Expression 1) that is known as an expression showing a qualitative relationship between the viscosity of an oxide and the diffusion velocity of a diffusing species in the oxide is preferable. When focusing on the eutectic point ($T_E$) (or melting point ($T_m$)) and the glass transition temperature ($T_g$) which determine the upper limit of the operating temperatures as indices for selecting a viscosity substance lowering the viscosity (η), the healing activator specifically comprising at least one metallic oxide satisfying (Expression 2) of the above conditional expressions is preferable, more preferably further satisfying (Expression 3) of the above conditional expressions. In view of such circumstances, taking the case where the oxide produced from the healing agent in the $Al_2O_3$/SiC composite is $SiO_2$ as one example, Table 1 shows results of selecting the healing activators (MxOy) satisfying both the glass transition temperature in (Expression 2) of the above conditional expressions and the eutectic point in (Expression 3) of the above conditional expressions, the results obtained using thermodynamic calculation software FactSage Ver. 6.4, phase diagram software Acera-NIST Phase Equilibria Diagrams Version 3.4, and the prediction expression proposed by Hui et al. (H. Hui and Y. Zhang, "Toward a general viscosity equation for natural anhydrous and hydrous silicate melts", Geochimica et cosmochimica Acta 71 (2007) 403-416; G. Zhong K. Chou. Measuring and modeling viscosity of $CaO-Al_2O_3-SiO_2(-K_2O)$melt, Metallugical and Materials Transaction B, 43 (2012) 841-848). The glass transition temperature ($T_g$) herein was determined to be a temperature at a viscosity (η) of $10^{11.3}$ Pa·s.

FIG. 5 shows the relationship between the glass transition temperature ($T_g$) and the eutectic point ($T_E$) (=melting point ($T_m$)) with respect to various composites ($lSiO_2$-$mAl_2O_3$-$nMxOy$) in Table 1, wherein the glass transition temperature ($T_g$) is estimated in a composition in which the eutectic point ($T_E$) and the melting point ($T_m$) coincide with each other. It is to be noted that, in FIG. 5, the unit of temperature in $T_g=\frac{2}{3} T_E$ and $T_g=\frac{1}{2} T_E$ expressed as a slope in the figure is expressed for convenience in terms of K (Kelvin temperature), and the unit of temperature other than the above is expressed in terms of ° C. (Celsius).

Incidentally, as shown in FIG. 5, with respect to the healing activator, a relationship of $T_g$ [K]=$\frac{2}{3}$ $T_E$ [K: Kelvin] to ½ $T_E$ [K] (or $T_g$ [K]=$\frac{2}{3}$ $T_m$ [K] to ½ $T_m$ [K]) holds generally, and therefore it can be estimated that the glass transition temperature ($T_g$) of the healing activator is approximately in a range of $T_g$ [K]=$\frac{2}{3}$ $T_E$ [K] to ½ $T_E$ [K] (or $T_g$ [K]=$\frac{2}{3}$ $T_m$ [K] to ½ $T_m$ [K]). Therefore, $T_g$ was estimated using this relationship for the healing activators only the eutectic point of which is known and the glass transition temperature ($T_g$) of which cannot be acquired from thermodynamic calculation and references and listed in Table 1.

TABLE 1

| | Healing activator $M_XO_Y$ | Eutectic point, $T_E$ $Al_2O_3$—$M_XO_Y$ [° C.] | Composition in which melting point = eutectic point $lSiO_2$—$mAl_2O_3$—$nM_XO_Y$ l:m:n: [mol] | Eutectic point $T_E$ (=melting point)$T_m$ $SiO_2$—$Al_2O_3$—$M_XO_Y$ [° C.] | Glass transition temperature of $lSiO_2$—$mAl_2O_3$—$nMxOy$, Tg | | |
|---|---|---|---|---|---|---|---|
| | | | | | Hui model[8] Zhang model[9] | Fact Sage [° C.] | $\frac{2}{3}T_m$[K]~½$T_m$[K] |
| $SiO_2$ alone | | 2050 (melting point of $Al_2O_3$) | l = 1 | 1722 | 1235 | 1192 | — |
| $SiO_2$—$Al_2O_3$ | Not used | 2050 (melting point of $Al_2O_3$) | l:n = 0.928:0.072 | 1594 | 961 | 943 | — |
| Group 1: alkali metal | $Li_2O$ | 1055[2] | 0.613:0.043283:0.21353 | 985 | — | — | 566~356 |
| | $Na_2O$ | 1099 | 0.65790:0.07647:0.26564 | 731 | 394 | 342 | — |
| | $K_2O$ | 1883 | 0.6632:0.0311:0.3057 | >800[3] | 393 | 365 | — |
| Group 2 | MgO | 1980 | 0.696:0.148:0.156 | 1362 | 855 | 816 | — |
| | CaO | 1360 | 0.63835:0.08208:0.27958 | 1185 | 730 | 460 | — |
| Group 2: alkaline earth metal | BaO | ≈1700[4] | 0.5508:0.0858:0.3634 | 1200~1300[4] | — | — | 742~488 |
| | SrO | 1560 | 0.658:0:0.342 | 1358 | — | — | 814~542 |
| Group 12 | ZnO | 1731 | 0.53713:0.08007:0.38280 | 1317 | — | 341 | — |

TABLE 1-continued

| | Healing activator $M_XO_Y$ | Eutectic point, $T_E$ $Al_2O_3$—$M_XO_Y$ [° C.] | Composition in which melting point = eutectic point $ISiO_2$—$mAl_2O_3$—$nM_XO_Y$ l:m:n: [mol] | Eutectic point $T_E$ (=melting point)$T_m$ $SiO_2$—$Al_2O_3$—$M_XO_Y$ [° C.] | Glass transition temperature of $ISiO_2$—$mAl_2O_3$—$nMxOy$, Tg | | |
|---|---|---|---|---|---|---|---|
| | | | | | Hui model[8] Zhang model[9] | Fact Sage [° C.] | $^{2}/_{3}T_m[K]\sim^{1}/_{2}T_m[K]$ |
| Group 13 | $Ga_2O_3$ | 1795 | — | — | — | — | — |
| | $GeO_2$ | 1030 | — | — | — | — | — |
| Group 14 | SnO | 1031 | l:n = 1:1 | 890[5] | — | — | 502~309 |
| | PbO | 858 | 0.61118:0.07529:0.31352 | 628 | — | 337 | 323~178 |
| Group 15 | $P_2O_5$ | 1845 | l:n = 0.8:0.2 | 933[6] | — | — | 531~330 |
| | $Bi_2O_3$ | 820 | — | 890[7] | 460[7] | — | — |
| | $TiO_2$ | 1700 | l:n = 0.9361:0.0639 | 1546 | 889 | 793 | 940~636 |
| | $V_2O_5$ | 640 | 0.0101:0.0022:0.9878 | 656 | — | — | 346~192 |
| | $Cr_2O_3$ | 2050 | 0.9525:0.0382:0.0093 | 1591 | — | — | 970~659 |
| Transition metal (Fourth period) | MnO | 1455 | 0.519:0.078:0.402 | 1109 | 479 | 276 | — |
| | $Fe_2O_3$ | 1580 | 0.50939:0.15165:0.33896 | 1390 | 563 | 167 | — |
| | CoO | 1690 | 0.50136:0.07181:0.42682 | 1287 | — | — | 767~507 |
| | NiO | 1860 | 0.50349:0.10987:0.38664 | 1519 | — | 430 | — |
| | CuO | 1230 | 0.66592:0.00255:0.33153 | 1086 | — | — | 633~407 |
| | $Y_2O_3$ | 1810 | — | 1300~1400 | — | — | 809~539 |
| Transition metal (Fifth period) | $ZrO_2$ | 1910 | 0.92643:0.05075:0.02281 | 1556 | — | — | 946~642 |
| | $Nb_2O_5$ | 1425 | — | — | — | — | — |

[1] R. Roy, and E. F. Osborn, "The system lithium metasilicate spodumene silica", J. Am. Chem. Soc. Vol. 71, No. 6, pp. 2086-2095 (1949)
[2] L. P. Cook and E. R. Plante, "Phase diagram of the system $Li_2O$—$Al_2O_3$", J. Am. Ceram. Soc., Vol. 27, No. 3, pp. 193-222 (1992).
[3] M. S. Cilla and M. R. Morelli, "Effect of addition of inorganic components on the mechanical strength of sand molds for casting", Vol. 58, No. 345, pp. 71-76 (2012).
[4] N. A. Toropov, F. Y. Galakhov and I. A. Bondar, "The diagram of state of the ternary system BaO—$Al_2O_3$—$SiO_2$", Institute of Chemistry of Silicates Academy of Sciences, pp. 647-655 (1954).

As shown in Table 1, it was confirmed that the glass transition temperature of $SiO_2$—$Al_2O_3$, which is 943° C. can be reduced to 167° C. at a maximum depending on the kind of the healing activator.

The healing activator more effectively lowering the viscosity of a mixture of the oxide produced from a healing agent and the matrix by the addition thereof wherein the healing agent contributes to completely filling the crack that has occurred and bonding the crack surfaces is particularly preferable.

In addition, the healing activator having a eutectic point of $Al_2O_3$-healing activator and $SiO_2$—$Al_2O_3$-healing activator of equal to or more than the upper limit of the operating temperatures of a member assumed to be used is preferable in that the healing function is enhanced without lowering the high-temperature strength of the member.

From these viewpoints and the viewpoint of versatility and the like, MgO having a glass transition temperature ($T_g$) of 855° C. and MnO having a glass transition temperature ($T_g$) of 479° C. were selected and used as the healing activator in the Examples of the present application.

[Verification of Effects of Healing Activators on Strength Recovery in $Al_2O_3$/30 vol. % SiC/0.2 vol. % MgO Composite and $Al_2O_3$/30 vol. % SiC/0.2 vol. % MnO Composite]

The effects of MgO and MnO added as the healing activator were verified using the $Al_2O_3$/30 vol. % SiC/0.2 vol. % MgO composite and the $Al_2O_3$/30 vol. % SiC/0.2 vol. % MnO composite which were prepared in the Examples by comparing the relationship between the glass transition temperature ($T_g$) (=temperature at viscosity of $10^{11.3}$ Pa·s) and the shortest time for complete crack-healing ($t_H^{Min}$) for the supercooled melts produced in these composites with that for the supercooled melt produced in the conventional $Al_2O_3$/30 vol. % SiC composite to which the healing activator is not added. The results are shown in FIG. 6. It is to be noted that the right frame of FIG. 6, the shortest time for complete crack-healing ($t_H^{Min}$) at 800° C., at 1000° C., and at 1200° C. calculated from an expression for predicting crack-healing wherein the expression is constructed separately through theoretical analysis of the crack-healing by the present inventors are additionally described as a predicted shortest time for complete crack-healing ($t_H^{Min}$) for reference.

It was found from FIG. 6 that the shortest time for complete crack-healing ($t_H^{Min}$) obtained in the temperature range of 800° C. to 1200° C. as the operating temperatures (namely, crack-healing temperature ($T_H$)) of the oxidation-induced self-healing ceramic composition is greatly shortened as the eutectic point ($T_E$) is lowered by the addition of MgO or MnO of the healing activator. Particularly in the case where MnO was added as the healing activator, it was found that the shortest time for complete crack-healing ($t_H^{Min}$) is less than 10 min at 1000° C. and 30 hours at 800° C. and is shortened to be less than 1/6000 times shorter and 1/547 times shorter, respectively, compared with the shortest time for complete crack-healing ($t_H^{Min}$) predicted in the case where MnO is not added.

In addition, the shortest time for complete crack-healing ($t_H^{Min}$) is increased as the crack-healing temperature ($T_H$) is lowered, and in the conventional $Al_2O_3$/30 vol. % SiC composite, the shortest time for complete crack-healing ($t_H^{Min}$) predicted at a crack-healing temperature ($T_H$) of 800° C. is very long, as long as 16400 hours. Therefore, it is considered that healing is practically difficult in this case. However, as shown in FIG. 6, in the case where MnO was added as the healing activator, it was found that the lowering of the crack-healing temperature is succeeded because the crack-healing at the same temperature can be achieved in a shortest time for complete crack-healing ($t_H^{Min}$) of 30 hours.

Accordingly, according to the oxidation-induced self-healing ceramic composition comprising MgO or MnO as the healing activator, it became clear that the velocity necessary for the strength recovery in the self-healing process is enhanced, and the temperature necessary for crack-healing is lowered, so that the enhancement of the functionality can be realized.

Example 2

[Preparation of $Al_2O_3$/30 vol. % SiC/1.0 vol. % MnO Composite and Mullite/30 vol. % $TiSi_2$/1.0 vol. % MnO Composite]

An $Al_2O_3$/30 vol. % SiC/1.0 vol. % MnO composite was prepared by: using, as a raw material powder, a mixture obtained by mixing 1.0 vol. % of the MnO powder as the healing activator with the $Al_2O_3$/30 vol. % SiC composite; and hot-press sintering the raw material powder under conditions of 40 MPa, 1550° C. and 1 hour in an Ar atmosphere.

A mullite/30 vol. % $TiSi_2$/1.0 vol. % MnO composite was prepared by: using, as a raw material powder, a mixture obtained by mixing 1.0 vol. % of the MnO powder as the healing activator with a mullite/30 vol. % $TiSi_2$ composite; and hot-press sintering the raw material powder under conditions of 40 MPa, 1300° C., and 4 hours in the Ar atmosphere. It is to be noted that a $TiSi_2$ powder has a large particle diameter and therefore was used by performing preliminary pulverization thereon before the mixing.

Smooth specimens for in-situ observation and strength evaluation were prepared from the prepared $Al_2O_3$/30 vol. % SiC/1.0 vol. % MnO composite and mullite/30 vol. % $TiSi_2$/1.0 vol. % MnO composite. A semi-elliptical pre-crack having a surface length of about 100 μm or 150 μm was introduced to the smooth specimens under a load of 2 kgf using the Vickers hardness meter. Heat treatment was performed on the pre-crack specimens in the high-temperature in-situ observation apparatus to conduct qualitative evaluation of the amount of the surface oxide, local melting behavior, and the viscosity of the oxide. It is to be noted that a high-temperature observation stage for a microscope manufactured by YONEKURA MFG Co., Ltd. was used as the in-situ observation apparatus. Heating was performed by a lamp light collection method, and the observation was performed with an optical microscope. Healing treatment was performed on the periphery of the pre-crack by a lamp light collection heating method, and the state of the healing treatment was observed.

Moreover, crack-healing treatment was performed under conditions of a temperature of 600° C. to 1000° C. and 0.017 hours to 300 hours in the air. The strengths of crack-healed specimens were evaluated by the three-point bending method at room temperature.

[In-Situ Observation of $Al_2O_3$/30 Vol. % SiC/1.0 Vol % MnO Composite]

The in-situ observation of the $Al_2O_3$/30 vol. % SiC/1.0 vol. % MnO composite and the mullite/30 vol. % $TiSi_2$/1.0 vol. % MnO composite which were prepared in the Examples was conducted. The results for the $Al_2O_3$/30 vol. % SiC/1.0 vol. % MnO composite of them will be described in detail below. It is to be noted that the apparatus and the like used for the in-situ observation are the same as in Example 1.

The occurrence of the low-viscosity oxide was observed at about 1000° C. in the $Al_2O_3$/30 vol. % SiC/1.0 vol. % MnO composite. The temperature was 440° C. lower than that in the conventional $Al_2O_3$/30 vol. % SiC composite to which the MnO powder is not added. This is because the viscosity of the oxide of the supercooled melt is greatly lowered by the addition of MnO of the healing activator.

Further, it was confirmed that the surface of the conventional $Al_2O_3$/30 vol. % SiC composite to which the MnO powder was not added was smooth at 1000° C., but in contrast, the surface of the $Al_2O_3$/30 vol. % SiC/1.0 vol. % MnO composite was uneven and the oxide which is considered as $SiO_2$ was produced in large quantity. It is considered that this is because the velocity of the volume increase of the oxide caused by the oxidation reaction is increased due to the lowering of the viscosity.

[Verification of Effects of Healing Activator on Strength Recovery in $Al_2O_3$/30 Vol. % SiC/1.0 Vol. % MnO Composite and Mullite/30 Vol. % $TiSi_2$/1.0 Vol. % MnO Composite]

Figure 7:
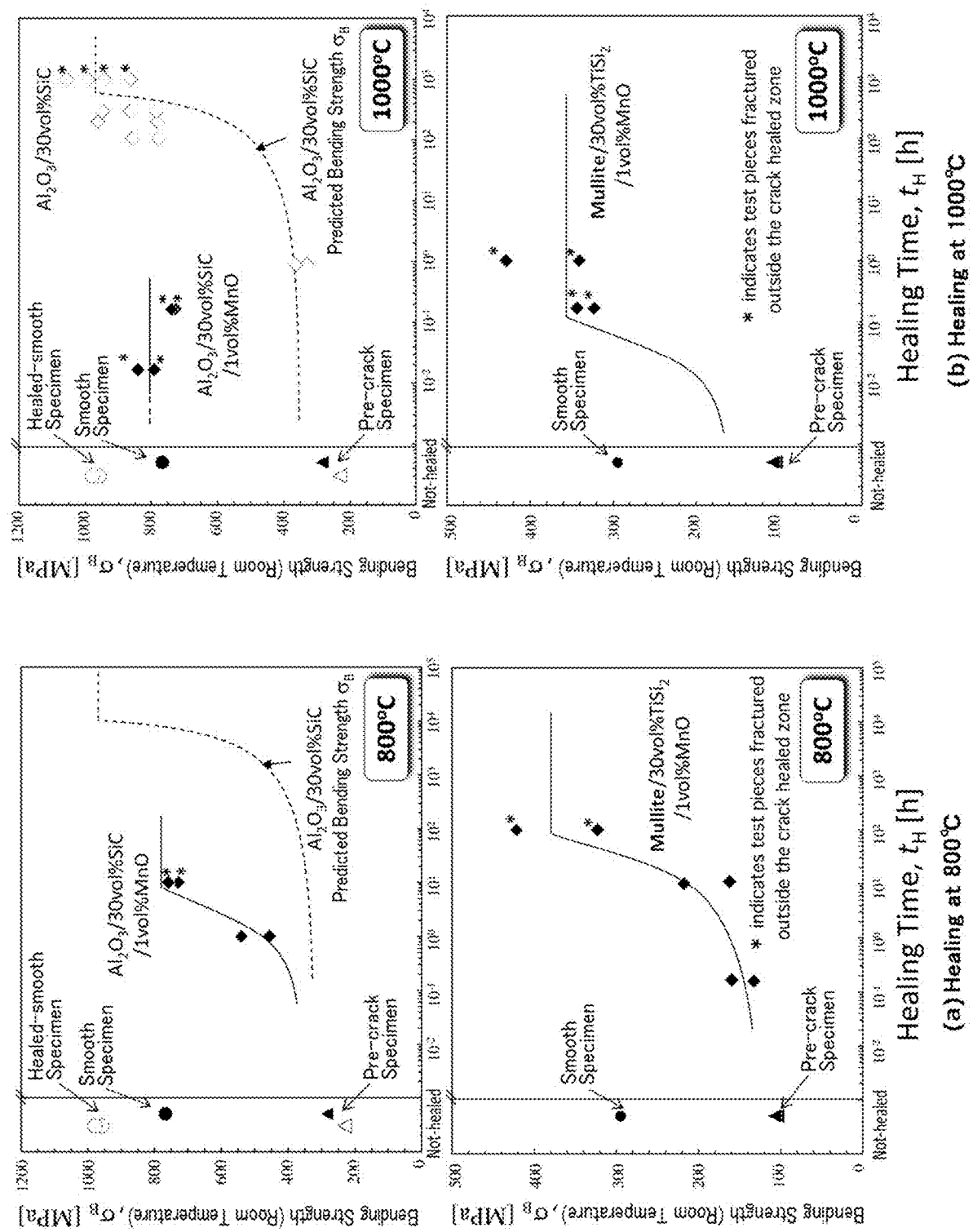
FIG. 7(a) is a graph showing a relationship between bending strength (σ$_B$) and healing time (t$_H$) at 800° C. for an Al$_2$O$_3$/30 vol. % SiC/1.0 vol. % MnO composite and a mullite/30 vol. % TiSi$_2$/1.0 vol. % MnO composite each being one embodiment of the present invention by comparison with a conventional Al$_2$O$_3$/30 vol. % SiC composite to which a healing activator is not added.
FIG. 7(b) is a graph showing a relationship between bending strength (σ$_B$) and healing time (t$_H$) at 1000° C. for an Al$_2$O$_3$/30 vol. % SiC/1.0 vol. % MnO composite and a mullite/30 vol. % TiSi$_2$/1.0 vol. % MnO composite each being one embodiment of the present invention by comparison with the conventional Al$_2$O$_3$/30 vol. % SiC composite to which a healing activator is not added.

The influence of the healing time ($t_H$) in the strength recovery was verified with respect to the $Al_2O_3$/30 vol. % SiC/1.0 vol. % MnO composite and the mullite/30 vol. % $TiSi_2$/1.0 vol. % MnO composite which were prepared in the Examples, and the conventional $Al_2O_3$/30 vol. % SiC composite to which the healing activator is not added. The results are shown in FIGS. 7(a) and (b). FIG. 7(a) shows the relationship between the bending strength ($\sigma_B$) and the healing time ($t_H$) at an operating temperature of 800° C. with respect to these composites, and FIG. 7(b) shows the relationship between the bending strength ($\sigma_B$) and the healing time ($t_H$) at an operating temperature of 1000° C. with respect to these composites. It is to be noted that test pieces expressed by "*" marked in these figures show the following: the rupture from a zone other than the crack healed zone occurred; and the fracture-initiating point transferred to the internal flaw outside the crack healed zone, namely that the crack was completely healed.

As shown in FIG. 7(a), it was found that the strength of the pre-crack specimen of the $Al_2O_3$/30 vol. % SiC/1.0 vol. % MnO composite at an operating temperature of 800° C. is greatly improved with the healing time until the crack is healed. In addition, it was found that the crack can be completely healed even at an operating temperature of 800° C. at which healing cannot be confirmed in the conventional specimen, the $A_2O_3$/30 vol. % SiC composite, and that the pre-crack specimen of the $Al_2O_3$/30 vol. % SiC/1.0 vol. % MnO composite exhibits the strength equivalent to the smooth specimen in 10 hours. Moreover, it was also found that the shortest time for complete crack-healing ($t_H^{Min}$) is improved when the operating temperature increases as shown in FIGS. 7(a) and (b).

In addition, it was found that in the mullite/30 vol. % $TiSi_2$/1.0 vol. % MnO composite, the shortest time for complete crack-healing ($t_H^{Min}$) at 800° C. is 100 hours as shown in FIG. 7(a), but the shortest time for complete crack-healing ($t_H^{Min}$) at 1000° C. is 10 min as shown in FIG. 7(b) and therefore is improved greatly.

Moreover, it was found that the $Al_2O_3$/30 vol. % SiC/1.0 vol. % MnO composite can heal the crack completely at a higher speed than the mullite/30 vol. % $TiSi_2$/1.0 vol. % MnO composite compounded with $TiSi_2$ which has a higher oxidation activity at the same operating temperature as shown in FIGS. 7(a) and (b). $TiSi_2$ is the healing agent having a far higher activity for oxidation than SiC in the reactive phase, and therefore it can be understood that this is because in the above composite to which the healing activator is added, the velocity of the reparative phase, not the velocity of the reactive phase, controls the entire healing velocity, so that such reversal of the above healing velocity occurred (namely, a composite using SiC as the healing agent was able to completely heal the crack at higher speed than a composite using $TiSi_2$ as the healing agent). Accordingly, it was found that the results in FIGS. 7(a) and (b) showing the reversal of the above healing velocity show that the lowering of the viscosity of the oxidation product and facilitation of oxygen diffusion in the oxide by the lowering of the viscosity of the oxidation product is extremely important in speeding up the crack-healing rather than the high oxidation activity of the healing agent. In this regard, the existence of $TiO_2$ of the oxides, $SiO_2$ and $TiO_2$, produced from $TiSi_2$ is also considered as one of the factors to prevent the lowering of the viscosity of the oxide with respect to the reversal of the above healing velocity.

[Verification of Application of $Al_2O_3$/30 Vol. % SiC/1.0 Vol. % MnO Composite, $Al_2O_3$/30 vol. % SiC/0.2 vol. % MnO Composite, $Al_2O_3$/30 vol. % SiC/0.2 vol. % MgO Composite, and Mullite/30 vol. % $TiSi_2$/1.0 vol. % MnO Composite to Low-Pressure Turbine Blades and Vanes]

With regard to the $Al_2O_3$/30 vol. % SiC/0.2 vol. % MgO composite and the $Al_2O_3$/30 vol. % SiC/0.2 vol. % MnO composite which were prepared in Example 1, the $Al_2O_3$/30 vol. % SiC/1.0 vol. % MnO composite and the mullite/30 vol. % $TiSi_2$/1.0 vol. % MnO composite which were prepared in Example 2, and the conventional $Al_2O_3$/30 vol. % SiC composite to which the healing activator is not added, the application of them to low-pressure turbine blades and vanes was verified. The results are shown in FIG. 8. FIG. 8 shows the relationship between the shortest time for complete crack-healing ($t_H^{Min}$) and the healing temperature ($T_H$) with respect to these composites along with the operating temperatures of the turbine vanes (stator vanes) and blades (rotor blades) for an aircraft engine and the cruise time of an aircraft. The $Al_2O_3$/30 vol. % SiC composite is listed as a comparative specimen, and the shortest times for complete crack-healing ($t_H^{Min}$) of the experimental values are shown along with the predicted values for the $Al_2O_3$/30 vol. % SiC composite. The operating temperatures of the turbine vanes (stator vanes) and blades (rotor blades) for an aircraft engine in FIG. 8 are listed as one example of operating temperatures obtained by analogy from the structure of the CF6 engine of a general-purpose jet engine with combustion simulation software (NASA-Chemical Equilibrium with application), wherein an uncooled jet engine to which the application of the oxidation-induced self-healing ceramic is expected is assumed to be used (T. Osada, Kinetic Model for Self-Crack-Healing in Ceramics and Possibility of Turbine Blade Applications, Proceedings of International Conference on Self-Healing Materials, ICSHM2013, (2013) 573). Moreover, as one example of the cruise time of an aircraft, a cruise time of 1 hour which is a cruise time in a domestic flight in Japan as a very short cruise time, is also shown in FIG. 8 for reference.

As shown in FIG. 8, the shortest time for complete crack-healing ($t_H^{Min}$) of the conventional $Al_2O_3$/30 vol. % SiC composite to which the healing activator is not added was approximately 5 hours (experimental value), approximately 1000 hours (experimental value), approximately 16400 hours (predicted value), and approximately 686100 hours (about 78 years) (predicted value) at 1200° C., 1000° C., 800° C., and 600° C., respectively.

On the other hand, the shortest time for complete crack-healing ($t_H^{Min}$) of the $Al_2O_3$/30 vol. % SiC/1.0 vol. % MnO composite was less than 1 min, 10 h, and 300 h at 1000° C., 800° C., and 600° C., respectively. Therefore, it was found that by adding 1.0 vol. % of MnO of the healing activator, the healing velocity can be greatly improved to be exceeding 60000 times faster, 1640 times faster, and 2287 times faster, compared with the conventional specimen of the $Al_2O_3$/30 vol. % SiC composite to which MnO is not added (in other words, shortest time for complete crack-healing ($t_H^{Min}$) is shortened to be less than 1/60000 times shorter, 1/1640 times shorter, and 1/2287 times shorter, respectively).

The shortest time for complete crack-healing ($t_H^{Min}$) of the $Al_2O_3$/30 vol. % SiC/0.2 vol. % MnO composite was less than 10 min and 30 hours at 1000° C. and 800° C., respectively. Therefore, it was found that by adding 0.2 vol. % of MnO of the healing activator, the healing velocity can be improved to be exceeding 6000 times faster and 547 times faster at 1000° C. and 800° C., respectively, compared with the conventional specimen of the $Al_2O_3$/30 vol. % SiC composite to which MnO is not added.

The shortest time for complete crack-healing ($t_H^{Min}$) of the mullite/30 vol. % $TiSi_2$/1.0 vol. % MnO composite was less than 10 min and 100 hours at 1000° C. and 800° C., respectively. Therefore, it was found that the healing velocity can be improved to be exceeding 6000 times faster and 164 times faster, compared with the conventional specimen of the $Al_2O_3$/30 vol. % SiC composite.

Also, the shortest time for complete crack-healing ($t_H^{Min}$) of the $Al_2O_3$/30 vol. % SiC/0.2 vol. % MgO composite was 10 min at 1200° C. Therefore, it was found that by adding 0.2 vol. % of MgO of the healing activator, the healing velocity can be improved to be 60 times faster compared with the conventional specimen of the $Al_2O_3$/30 vol. % SiC composite to which MgO is not added.

Accordingly, with respect to all the composites ($Al_2O_3$/30 vol. % SiC/1.0 vol. % MnO composite, $Al_2O_3$/30 vol. % SiC/0.2 vol. % MnO composite, $Al_2O_3$/30 vol. % SiC/0.2 vol. % MgO composite, and mullite/30 vol. % $TiSi_2$/1.0 vol. % MnO composite) which are shown as one embodiment of the present invention in FIG. 8 and to which the healing activator is added, it was confirmed that the healing velocity of them in the operating temperature region of 600° C. to 1200° C. is remarkably enhanced compared with the conventional specimen of the $Al_2O_3$/30 vol. % SiC composite to which the healing activator is not added.

Particularly, it was confirmed that the $Al_2O_3$/30 vol. % SiC/1.0 vol. % MnO composite, the $Al_2O_3$/30 vol. % SiC/0.2 vol. % MnO composite, the $Al_2O_3$/30 vol. % SiC/0.2 vol. % MgO composite, and the mullite/30 vol. % $TiSi_2$/1.0 vol. % MnO composite are extremely effective when these composites are applied to high-temperature structural members used in operating temperature regions similar to the operating temperatures of the 1st stage low-pressure turbine vanes (vanes) and rotor blades (blades) and the 2nd to 3rd stage low-pressure turbine stator vanes (vanes) and rotor blades (blades) of an aircraft engine.

In addition, it was confirmed that the $Al_2O_3$/30 vol. % SiC/1.0 vol. % MnO composite, the $Al_2O_3$/30 vol. % SiC/0.2 vol. % MnO composite, and the mullite/30 vol. % $TiSi_2$/1.0 vol. % MnO composite in which MnO is used as the healing activator are extremely effective for the application to high-temperature structural members such as the 2nd stage low-pressure turbine stator vanes (vanes) and rotor blades (blades) of the CF6 engine, of which the operating temperature region is limited to a temperature range of approximately 890° C. to approximately 1030° C., provided that the cruise time is 1 hour and a surface crack which occurs during the cruise time has to be completely healed.

Accordingly, it became clear that the oxidation-induced self-healing ceramic according to the present embodiment can be applied to high-temperature members, particularly to low-pressure turbine blades and vanes of an aircraft, in which the effective exhibition of the self-healing function for a crack occurred has been difficult in the conventional oxidation-induced self-healing ceramic.

[Verification of Influence of Healing Activator on Strength of Sintered Specimens]

To investigate an influence of the healing activator on the strength of sintered specimens, the strength was measured under the same conditions for a smooth specimen of alumina ($Al_2O_3$) alone, a smooth specimen obtained by adding 30 vol. % of SiC as the healing agent to alumina ($Al_2O_3$) alone, and smooth specimens obtained by adding 0.2 vol % and 0.5 vol % of MnO as the healing activator to the $Al_2O_3$/30 vol. % SiC composite. As a result, the strength was 400 MPa, 748 MPa, 844 MPa. and 958 MPa for the respective specimens, and it was confirmed that the strength of the smooth specimens was increased by the addition of MnO. It is understood that this is because grain growth during sintering is suppressed by the addition of the healing agent, and further abnormal grain growth during sintering is suppressed by the addition of the healing activator.

On the other hand, when MnO was added at an amount of 1 vol % and 3 vol %, which are more than the above amount added, the strength of the smooth specimens was lowered to 766 Mpa and 575 Mpa, respectively. It is understood that this is because MnO was placed at a site other than the crystal grain boundary and MnO itself has become a fracture-initiating point.

In this way, for example, in the case of the $Al_2O_3$/30 vol. % SiC composite, it was confirmed that just adding a slight amount, 0.2 vol %, of MnO as the healing activator can improve the strength of the sintered specimen as well as the healing function.

Accordingly, it was found that in the oxidation-induced self-healing ceramic according to the present embodiment, the strength of the sintered specimen as well as the healing function can be improved by just adding a slight amount of the healing activator.

[Verification of Improvement in High-Temperature Strength of Crack-Healing Substance by Addition of $Yb_2O_3$]

Figure 9:
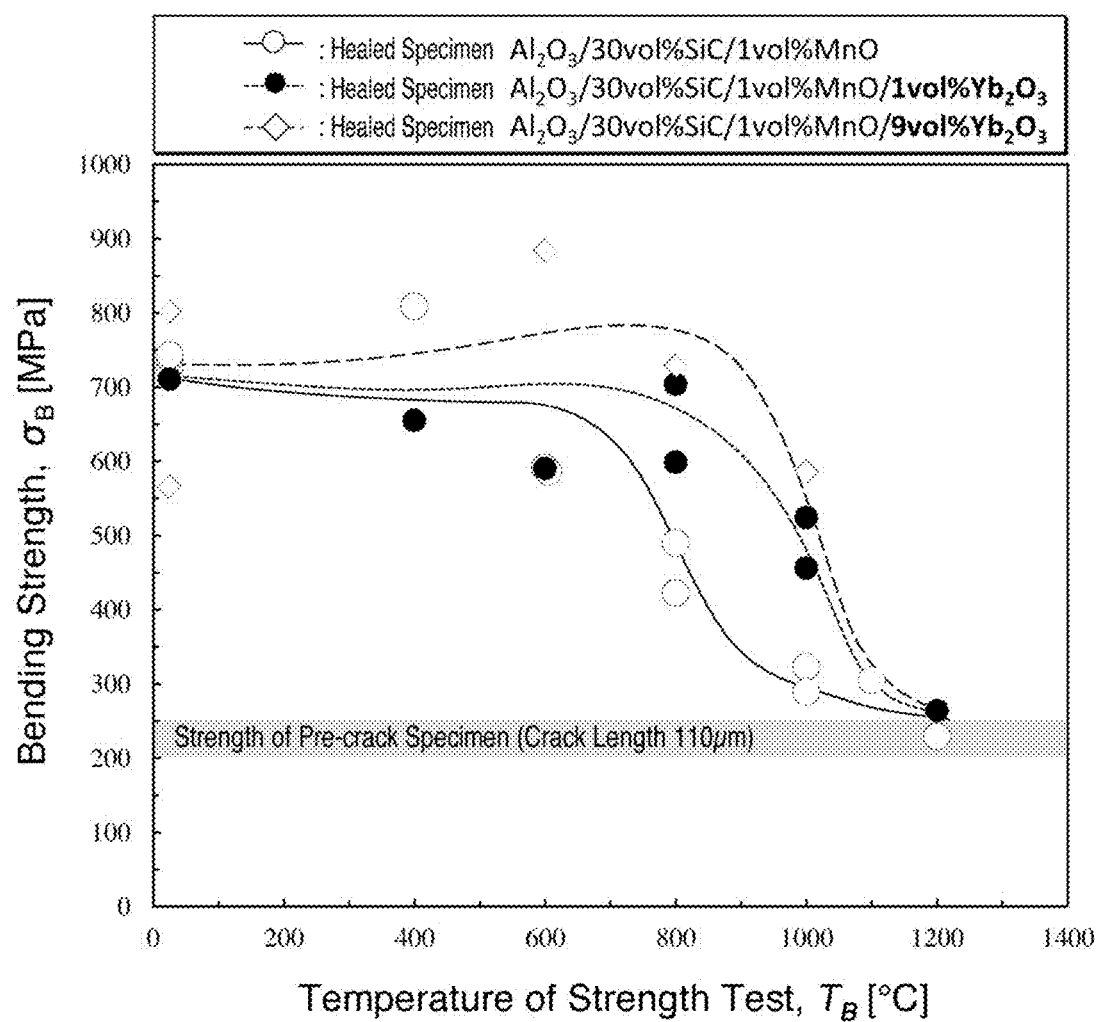
FIG. 9 is a graph showing a relationship between bending strength (σ$_B$) and temperature of test (T$_B$) with respect to a healed specimen of an Al$_2$O$_3$/30 vol. % SiC/1 vol. % MnO/1 vol. % Yb$_2$O$_3$ composite and a healed specimen of an Al$_2$O$_3$/30 vol. % SiC/1 vol. % MnO/9 vol. % Yb$_2$O$_3$ composite each being one embodiment of the present invention, wherein a slight amount of Yb$_2$O$_3$ is added as one example of an oxide having a function of enhancing high-temperature strength of a healing substance which has filled a crack by comparison with a healed specimen of an Al$_2$O$_3$/30 vol. % SiC/1 vol. % MnO composite to which Yb$_2$O$_3$ is not added.

An $Al_2O_3$/30 vol. % SiC/1 vol. % MnO/1 vol. % $Yb_2O_3$ composite and an $Al_2O_3$/30 vol. % SiC/1 vol. % MnO/9 vol. % $Yb_2O_3$ composite used for verification were prepared in the same manner as the $Al_2O_3$/30 vol. % SiC/1.0 vol. % MnO composite in Example 2 except that each volume % of $Yb_2O_3$ was added as a raw material powder. The $Al_2O_3$/30 vol. % SiC/1.0 vol. % MnO composite prepared in Example 2 is used as the $Al_2O_3$/30 vol. % SiC/1.0 vol. % MnO composite which $Yb_2O_3$ is not added for comparison. The strength as a pre-crack specimen obtained by introducing a pre-crack having a length of 110 μm to each composite was approximately 200 to approximately 250 MPa for any of the pre-crack specimens. A healed specimen was made by completely healing the introduced pre-crack at a temperature of 1000° C. for these pre-crack specimens to measure the bending strength for each healed specimen. The results are shown in FIG. 9. Accordingly, the bending strength of each healed specimen in the figure corresponds to the strength of the crack-healing substance that has filled the crack. The measurement method, the evaluation method, and the like were conducted in the same manner as in Example 2.

As shown in FIG. 9, the bending strength of the healed specimens at high temperatures is improved advantageously by adding $Yb_2O_3$. Moreover, even when the amount added is 1 vol. % which is a slight amount, the bending strength at high-temperatures is greatly improved. Accordingly, the addition of a slight amount of $Yb_2O_3$ is extremely effective for improving the high-temperature strength of the crack-healing substance.

INDUSTRIAL APPLICABILITY

According to the present invention, utilization for high-temperature structural members such as ceramics which are brittle materials, for example, utilization for turbine stator vanes and rotor blades used in an aircraft engine turbine can be greatly expected.

In addition to the aircraft field, utilization for a wide variety of fields (for example, automobile field, power generation field utilizing gas turbine or the like, or other fields) in which the enhancement of the velocity necessary for strength recovery in the self-healing process and the lowering of the temperature necessary for crack-healing have been difficult by the use of the conventional oxidation-induced self-healing ceramics and thus improvements in such properties have been required is feasible.

The invention claimed is:

1. An oxidation-induced self-healing ceramic composition consisting essentially of:
    a ceramic matrix;
    a non-oxide healing agent which is dispersed in the matrix and has oxidation activity; and
    a healing activator, wherein:
    the ceramic matrix consists essentially of alumina ($Al_2O_3$);
    the non-oxide healing agent is $TiSi_2$; and
    the healing activator is a substance enhancing a diffusion velocity of a substance determining a velocity of an oxidation reaction of the non-oxide healing agent and consists essentially of at least one selected from the group consisting of ZnO, $Fe_2O_3$, NiO, $Bi_2O_3$, $K_2O$, $Na_2O$, $Ga_2O_3$, $GeO_2$, SnO, $P_2O_5$, $V_2O_5$, CoO, CuO, and $Nb_2O_5$.

2. The ceramic composition according to claim 1, wherein the healing activator is placed at a crystal grain boundary of the matrix and at an interface between the matrix and the non-oxide healing agent.

3. The ceramic composition according to claim 1, wherein the healing activator consists essentially of at least one metallic oxide satisfying the following conditional expression:

> glass transition temperature ($T_g$) of a multi-component system of the oxide produced from the non-oxide healing agent, the matrix, and the healing activator<a lower limit value of operating temperature range of a high-temperature member to which the oxidation-induced self-healing ceramic is applied.

4. The ceramic composition according to claim 1, wherein an amount of the healing activator added is more than 0 and 10 volume % or less.

5. The ceramic composition according to claim 1, wherein when a substance consisting essentially of: the matrix; the oxide produced from the non-oxide healing agent; and the healing activator autonomously fills the crack occurred in the ceramic composition to bond surfaces of the crack and further solidifies to crystallize, thereby healing the crack, the ceramic composition further consists essentially of a substance enhancing, by addition, mechanical strength of the substance provided for the crack-healing, wherein the substance enhancing mechanical strength consists essentially of at least one selected from the group consisting of metallic oxides represented $Ce_2O_3$, $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, and $Lu_2O_3$.

6. A turbine for an air craft engine or a power generation, comprising the ceramic composition according to claim 1.

7. An automobile comprising the ceramic composition according to claim 1.

8. The ceramic composition according to claim 1, wherein the healing activator consists essentially of ZnO.

9. The ceramic composition according to claim 1, wherein the healing activator consists essentially of $Fe_2O_3$.

10. The ceramic composition according to claim 1, wherein the healing activator consists essentially of NiO.

11. The ceramic composition according to claim 1, wherein the healing activator consists essentially of $Bi_2O_3$.

12. The ceramic composition according to claim 1, wherein the healing activator consists essentially of $K_2O$.

13. The ceramic composition according to claim 1, wherein the healing activator consists essentially of $Na_2O$.

* * * * *